US012664667B2

(12) United States Patent
Diem et al.

(10) Patent No.: US 12,664,667 B2
(45) Date of Patent: Jun. 23, 2026

(54) REDUCING OBJECT TRACKING NOISE WITH POSE SMOOTHING

(71) Applicant: Snap Inc., Santa Monica, CA (US)

(72) Inventors: Markus Diem, Vienna (AT); Blake Lucas, Culver City, CA (US); Thomas Muttenthaler, Vienna (AT); Daniel Wolf, Mödling (AT)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/830,326

(22) Filed: Sep. 10, 2024

(65) Prior Publication Data

US 2026/0073536 A1 Mar. 12, 2026

(51) Int. Cl.
G06T 7/292 (2017.01)
G06F 3/01 (2006.01)
G06T 5/20 (2006.01)
G06T 5/70 (2024.01)
(Continued)

(52) U.S. Cl.
CPC .............. G06T 7/292 (2017.01); G06F 3/011 (2013.01); G06T 5/20 (2013.01); G06T 5/70 (2024.01); G06T 7/55 (2017.01); G06T 7/70 (2017.01); G06T 2207/30196 (2013.01); G06T 2207/30244 (2013.01)

(58) Field of Classification Search
CPC .. G06T 7/292; G06T 7/55; G06T 7/70; G06T 5/70; G06T 5/20; G06T 2207/30196; G06T 2207/30244; G06F 3/011
See application file for complete search history.

(56) References Cited

U.S. PATENT DOCUMENTS

| | | |
|---|---|---|
| 11,030,454 B1 | 6/2021 | Xiong et al. |
| 11,531,402 B1 | 12/2022 | Stolzenberg |
| 11,861,801 B2 | 1/2024 | Gurgul et al. |
| (Continued) | | |

FOREIGN PATENT DOCUMENTS

| | | |
|---|---|---|
| WO | 2022005687 | 1/2022 |
| WO | 2022060549 | 3/2022 |
| (Continued) | | |

OTHER PUBLICATIONS

US 12,013,985 B1, 06/2024, Stolzenberg et al. (withdrawn)
(Continued)

*Primary Examiner* — Robert J Michaud
(74) *Attorney, Agent, or Firm* — SCHWEGMAN LUNDBERG & WOESSNER, P.A.

(57) ABSTRACT

Examples in the present disclosure relate to systems and methods for reducing noise in object tracking data. Images of an object are obtained via one or more cameras. The images are processed to obtain first pose data indicative of a pose of the object over time. The first pose data is represented in a camera space. The first pose data is transformed to second pose data represented in a world space. The second pose data is filtered using a smoothing filter to generate filtered pose data. The filtering includes, for each pose data item in a time series of the second pose data, using a rotation transformation between the world space and camera space to apply one or more camera space-specific filter parameters to the pose data item that is represented in the world space. The pose of the object is dynamically tracked based on the filtered pose data.

20 Claims, 13 Drawing Sheets

(51) Int. Cl.
    *G06T 7/55*        (2017.01)
    *G06T 7/70*        (2017.01)

(56)          References Cited

U.S. PATENT DOCUMENTS

| | | | |
|---|---|---|---|
| 11,989,843 B2 | 5/2024 | Zhou et al. | |
| 2016/0301910 A1* | 10/2016 | Lucas | H04N 13/275 |
| 2018/0365853 A1 | 12/2018 | Yang et al. | |
| 2019/0146219 A1 | 5/2019 | Rodriguez, II | |
| 2021/0240280 A1* | 8/2021 | Horowitz | G06V 20/653 |
| 2022/0206588 A1 | 6/2022 | Canberk et al. | |
| 2022/0326781 A1 | 10/2022 | Hwang et al. | |
| 2023/0072423 A1* | 3/2023 | Osborn | G16H 20/30 |
| 2023/0350427 A1 | 11/2023 | Hintermann et al. | |
| 2023/0418062 A1 | 12/2023 | Wawruch | |
| 2023/0418385 A1 | 12/2023 | Feinman et al. | |
| 2024/0013493 A1 | 1/2024 | Arya et al. | |
| 2024/0070992 A1 | 2/2024 | Lucas | |
| 2024/0087609 A1 | 3/2024 | Goodrich et al. | |
| 2024/0127006 A1 | 4/2024 | Zhou et al. | |
| 2024/0187814 A1 | 6/2024 | Arya et al. | |
| 2024/0203072 A1 | 6/2024 | Solichin | |

FOREIGN PATENT DOCUMENTS

| | | |
|---|---|---|
| WO | 2022066578 | 3/2022 |
| WO | 2022132381 | 6/2022 |
| WO | 2022225761 | 10/2022 |
| WO | 2022245765 | 11/2022 |
| WO | 2023192386 | 10/2023 |
| WO | 2023220163 | 11/2023 |
| WO | 2023244490 | 12/2023 |
| WO | 2024049578 | 3/2024 |
| WO | 2024049579 | 3/2024 |
| WO | 2024063865 | 3/2024 |

OTHER PUBLICATIONS

De Balsch, Jaan Tollander, "Noise Filtering Using 1E Filter", [Online]. Retrieved from the Internet: https:jaantollander.com post noise-filtering-using-one-euro-filter , (May 29, 2020), 5 pgs.

"International Application Serial No. PCT/US2025/044006, International Search Report mailed Dec. 1, 2025", 3 pgs.

"International Application Serial No. PCT/US2025/044006, Written Opinion mailed Dec. 1, 2025", 4 pgs.

\* cited by examiner

600

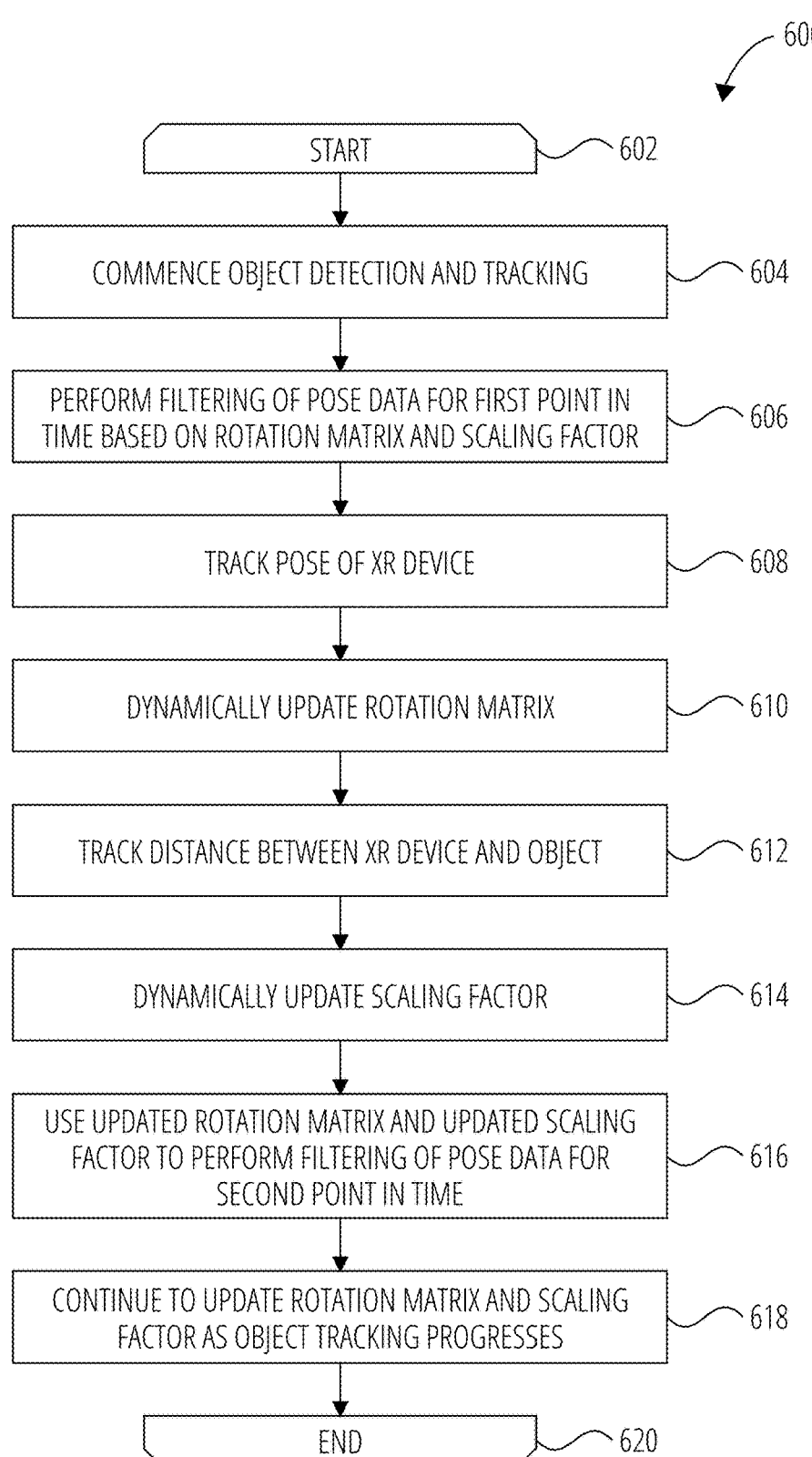

START ~ 602

COMMENCE OBJECT DETECTION AND TRACKING ~ 604

PERFORM FILTERING OF POSE DATA FOR FIRST POINT IN TIME BASED ON ROTATION MATRIX AND SCALING FACTOR ~ 606

TRACK POSE OF XR DEVICE ~ 608

DYNAMICALLY UPDATE ROTATION MATRIX ~ 610

TRACK DISTANCE BETWEEN XR DEVICE AND OBJECT ~ 612

DYNAMICALLY UPDATE SCALING FACTOR ~ 614

USE UPDATED ROTATION MATRIX AND UPDATED SCALING FACTOR TO PERFORM FILTERING OF POSE DATA FOR SECOND POINT IN TIME ~ 616

CONTINUE TO UPDATE ROTATION MATRIX AND SCALING FACTOR AS OBJECT TRACKING PROGRESSES ~ 618

END ~ 620

FIG. 6

REDUCING OBJECT TRACKING NOISE WITH POSE SMOOTHING

TECHNICAL FIELD

Subject matter disclosed herein relates, generally, to computer-implemented object tracking. More specifically, but not exclusively, the subject matter relates to devices, systems, and methods for facilitating object tracking in an extended reality (XR) context by reducing noise.

BACKGROUND

Many XR devices perform object tracking. For example, objects in the real world are tracked to provide realistic, entertaining, or useful XR experiences by displaying virtual content to a user of the XR device based on the position or movements of a tracked object.

Inaccuracies, errors, and random or unwanted fluctuations in the measured position and/or orientation of a tracked object relative to its actual position and/or orientation are commonly referred to as "noise." The term "jitter" may refer to noise in the form of rapid, undesired fluctuations in measurements. Noise may be caused by various factors, such as camera motion, image sensor properties, the distance between the object and the camera, or environmental factors. The presence of noise can lead to errors in the estimated position and/or orientation of the tracked object, thereby degrading the performance of the XR device and reducing the quality of the user experience.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which:

FIG. 6 is a flowchart illustrating operations of a method for filtering pose data, according to some examples.

DETAILED DESCRIPTION

Figure 1:
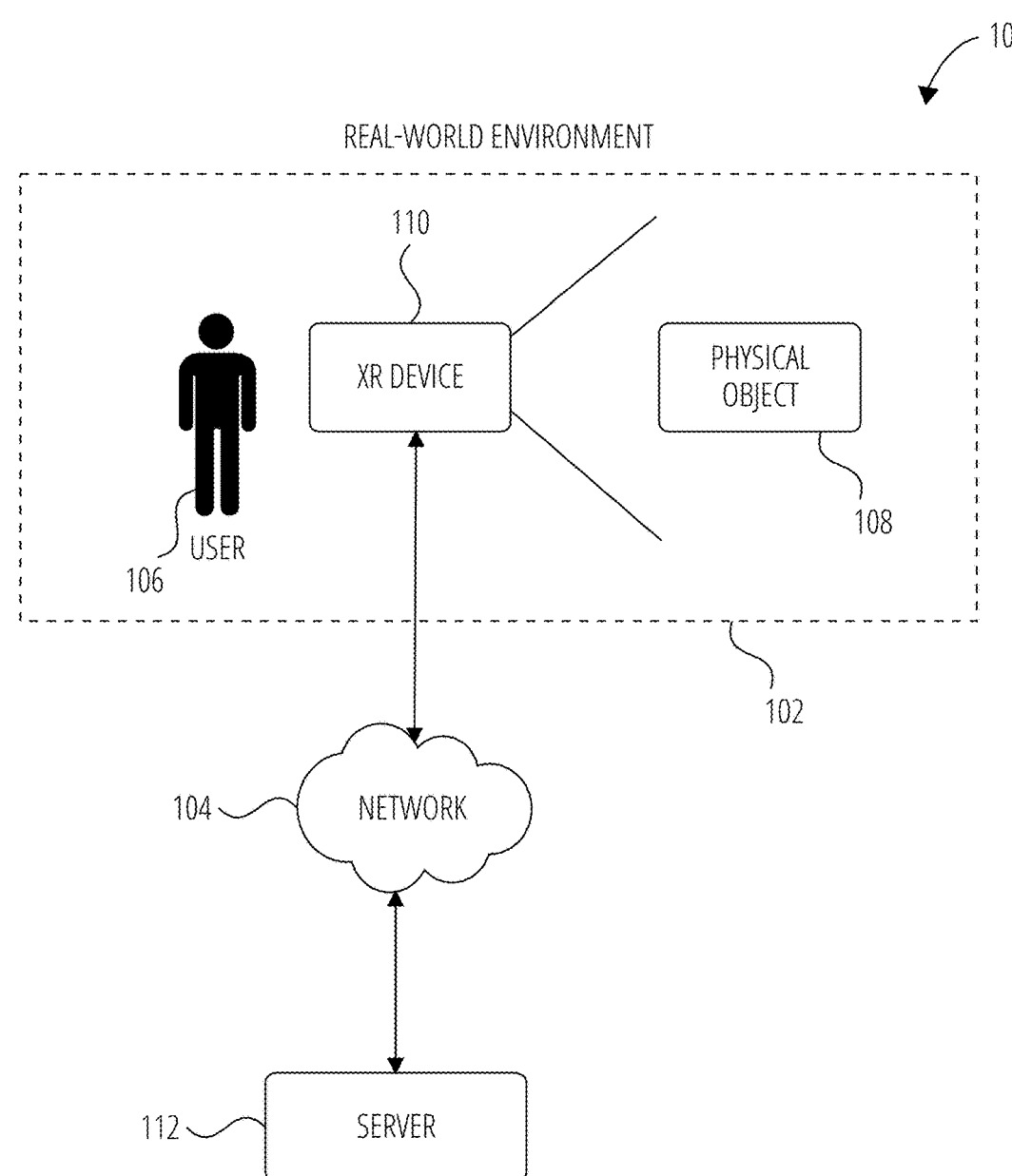
FIG. 1 is a block diagram illustrating a network environment for operating an XR device, according to some examples.

XR devices can include augmented reality (AR) devices or virtual reality (VR) devices. "Augmented reality" (AR) can include an interactive experience of a real-world environment where physical objects or environments that reside in the real world are "augmented" or enhanced by computer-generated digital content (also referred to as virtual content or synthetic content). AR can also refer to a system that enables a combination of real and virtual worlds (e.g., mixed reality), real-time interaction, or 3D registration of virtual and real objects. In some examples, a user of an AR system can perceive or interact with virtual content that appears to be overlaid on or attached to a real-world physical object. The term "AR application" is used herein to refer to a computer-operated application that enables an AR experience.

"Virtual reality" (VR) can include a simulation experience of a virtual world environment that is distinct from the real-world environment. Computer-generated digital content is displayed in the virtual world environment. VR can refer to a system that enables a user of a VR system to be completely immersed in the virtual world environment and to interact with virtual objects presented in the virtual world environment. While examples described in the present disclosure focus primarily on XR devices that provide an AR experience, it will be appreciated that one or more aspects of the present disclosure may also be applied to VR.

Swift and accurate detection and tracking of objects can improve the performance of XR devices. For example, many XR devices use hand gestures as inputs, and these XR devices thus benefit from effective tracking of the pose of the hand. The "pose" of an object, as used herein, may refer to its position (e.g., 3D positional coordinates), its orientation or rotational information (e.g., pitch, yaw, roll angles or quaternions), or combinations thereof (e.g., its pose expressed along six degrees of freedom, referred to as the "6DoF" pose). The pose may be related to a specific point (e.g., a landmark) or zone, or multiple points that represent the object. Pose data may thus include information describing the position and/or orientation of an object. Pose data may also incorporate additional parameters such as velocity, or acceleration related to the object's movement.

Filtering techniques can be applied to reduce jitter and improve the stability of object tracking in XR systems. For example, pose data is obtained by processing image data for an object from images captured using a camera of an XR device. The pose data includes a sequence of measurements describing the pose of the object over time. The pose data can then be smoothed using a smoothing filter (e.g., a filtering algorithm). An example of such a smoothing filter is a low-pass filter that incorporates time exponentially weighted measurements. The smoothing filter "fuses" (in a mathematical sense) measurements in the sequence to reduce jitter that may be present in the measured pose data.

Filtering involves data processing and can thus increase latency. The degree of filtering should, in many cases, not be such that it significantly degrades the XR experience, for example, by causing virtual content to be presented to a user too late, or by causing virtual content to be misaligned with respect to real-world objects. In other words, in some examples, the smoothing filter should combine measurements into a single output while balancing contrasting objects: accuracy and low latency on the one hand, and smoothness on the other hand.

For camera-based object tracking, which is typically performed by XR devices, it is possible to perform filtering in a camera space or in a world space. A "camera space," as used herein, may include a coordinate system that is defined relative to the position and orientation of a camera used for object tracking (e.g., a camera-fixed coordinate system). For example, this coordinate system moves and rotates along with the camera, such that the camera's position is the origin and its principal axis aligns with a specific coordinate axis. Camera space coordinates may thus represent the position of tracked objects from the perspective of a camera. A "world space," as used herein, may include a coordinate system that is defined in relation to a fixed reference frame in an environment where object tracking occurs (e.g., a global coordinate system). For example, in the case of XR device object tracking, the coordinate system of the world space remains stationary relative to the real world, regardless of movements of the XR device (e.g., the camera of the XR device). In some examples, world space coordinates represent the absolute position of tracked objects in 3D space.

A technical benefit of performing filtering in the camera space is that it is possible to exploit noise characteristics that are camera space-specific. For example, in many cases, noise is higher in the dimension parallel to the camera axis (e.g., axis perpendicular to the image plane) than in dimensions orthogonal to the camera axis. In other words, from the camera's perspective, a depth axis is often noisier than a horizontal axis or a vertical axis. In some examples, this is because position measurements are based on camera images, and depth estimation (along the camera axis) is inherently less precise than lateral position estimation. When filtering in the camera space, a smoothing filter can apply stronger filtering parameters for the dimension parallel to the camera axis to account for the expected noise in the camera axis.

In this context, "stronger" filtering means that a filter places relatively more weight on previous measurements or that a relatively longer data history is taken into account to reduce noise. For example, when comparing a stronger filter to a weaker filter, the stronger filter might apply more weight to previous measurements and less weight to the current measurement than the weaker filter. In some examples, a stronger filter provides for a more gradual decrease in weights for older samples over time compared to a weaker filter.

Filtering in the camera space thus allows for the option of exploiting axes-dependent noise characteristics. However, technical challenges can also arise when filtering in the camera space. Specifically, in the context of assessing positions in the camera space, the XR device cannot distinguish between motions of the camera and motions of the tracked object. For example, when the XR device (and thus its camera that captures the tracked object) moves, but the tracked object remains stationary in the real world, the tracked object still moves in the camera space because it moves relative to the camera. This can result in visual distortions in an XR experience, often referred to as "swimming" artifacts.

As an example of such visual distortions, when a user wears an XR device on their head and virtual content (e.g., a digital effect) should be presented so as to appear on the outstretched hand of the user, head movements cause the camera perspective to change even though the hand is kept still. As a result, when the user moves their head, the filtered pose data represented in the camera space changes, even if the real-world object is stationary. When this filtered data is used to position virtual content, it can create the appearance of the virtual content moving or "swimming" in the user's view, despite the corresponding real-world object being stationary.

The problem of "swimming" artifacts can be addressed or alleviated by filtering in the world space instead of the camera space, because the world space does account for relative motion between the camera and the world. For example, an XR device runs a Simultaneous Localization and Mapping (SLAM) system and/or a Visual-inertial Odometry (VIO) system that enables the XR device to convert initial positional measurements from the camera space (in which they are captured) to the world space. When processing data in the world space, the XR device assesses the position of the tracked object in absolute terms or relative to a fixed point in the real world, enabling it to properly distinguish between movements of the XR device and movements of the object.

However, a technical drawback related to the world space approach is that the camera orientations for measurements may be lost. In other words, the camera properties can no longer be exploited because the initial data has been transformed so as to be represented in the world space. For example, it might not be possible to apply, for example, stronger filtering parameters along the camera axis relative to other axes when filtering in the world space.

As a result, the filter that is selected for world space filtering often filters strongly along all axes in the world space to obtain the necessary smoothing of pose data, instead of being able to apply differing filtering strengths to pose data components related to different axes. As explained above, excessive filtering can result in technical problems by introducing lag and/or reducing accuracy, thereby degrading the performance of the XR device.

Examples described herein address or alleviate technical problems by enabling a computing device to combine benefits of filtering in the world space with benefits of filtering in the camera space. A filtering algorithm (e.g., a smoothing filter) is provided that allows for camera space-specific filter parameters to be applied to pose data that is represented in the world space.

In some examples, a method for facilitating object tracking is performed by a computing device, such as an XR device. For example, the computing device is a head-wearable device that includes one or more cameras, with the method being performed while the computing device is worn on the head of a user. In some examples, the object that is tracked by the computing device is a hand, such as a hand of the user in the real world. However, similar techniques can be applied to the tracking of other objects, such as the tracking a full body pose of a human.

The method may include capturing a plurality of images of an object (e.g., using one or more cameras of the computing device). The plurality of images are processed to obtain first pose data indicative of a pose of the object over time. The first pose data is represented in a camera space that is defined by a first coordinate system. The first pose data is transformed to second pose data represented in a world space that is defined by a second coordinate system.

The method may further include filtering the second pose data using a smoothing filter to generate filtered pose data. The filtered pose data is then applied to track the object over time.

In some examples, the smoothing filter combines benefits of world space and camera space filtering by applying camera space-specific filter parameters to data represented in the world space. For example, for each pose data item in a time series of the second pose data, a rotation transformation between the world space and the camera space is used to enable application of one or more camera space-specific filter parameters to the pose data item that is represented in the world space. In some examples, each pose data item in the time series comprises positional coordinates (such as (x, y, z) coordinates of the object or landmarks on the object) represented in the world space.

"Camera space-specific filter parameters," as used herein, may include parameters, settings, or values that determine the characteristics of a filter as applied to pose data in relation to a camera's perspective. The camera space-specific filter parameters can be tailored to address specific noise properties associated with different axes, dimensions, or features in camera space. For instance, the camera space-specific filter parameters may be parameters selected to apply stronger filtering along the camera's depth axis, where measurement uncertainty is typically higher, compared to axes perpendicular to the camera's line of sight.

Noise can be modeled as having different noise levels depending on the camera "extrinsics" (extrinsic parameters). For example, the noise level is expected to be higher when a tracked object is further away from the camera. Accordingly, camera space-specific filter parameters can be tailored or adjusted based on such parameters.

In some examples, a rotation transformation is applied within the smoothing filter to account for orientation of the first coordinate system relative to the second coordinate system. For example, a pose of the computing device is tracked in the world space (e.g., using a device tracking system, such as a SLAM or VIO system) and the rotation transformation is dynamically updated based on the pose of the computing device in the world space.

In some examples, the smoothing filter incorporates one or more scaling factors that adjust the filtering based on a distance between the object and one or more cameras. For example, the computing device tracks the distance between the object and a camera over time, and dynamically updates the one or more scaling factors based on this distance. In some examples, a scaling factor is applied for stronger filtering on pose data of objects that are farther away, and thus potentially subject to greater measurement uncertainty.

Accordingly, the rotation transformation and/or the smoothing filter can change over time while an object is being tracked. For example, the rotation transformation changes as the XR device rotates in the world space, and the smoothing filter changes as the object moves relative to the XR device. By applying updated values and parameters as tracking progresses, the smoothing filter provides an adaptive filter that has different parameters at different time steps. In some examples, the adaptive filter comprises, or is based on, a low-pass filter.

It is noted that the adaptive filter can be applied, for a particular time step, to current pose data and previous pose data with respect to the particular time step. For example, for a current pose data item in the time series, the rotation transformation and the one or more camera space-specific filter parameters are applied to input data comprising both the current pose data item and previous output data of the filtering corresponding to a previous pose data item in the time series.

Techniques described herein can be scaled to multi-camera configurations. For example, where the computing device has a plurality of cameras, at least one of the rotation transformation or the one or more camera space-specific filter parameters is different for each respective camera of the plurality of cameras. For example, data originating from respective camera images can be provided alongside respective parameters (e.g., rotation matrices) for those cameras based on the different properties of the cameras.

By tracking the filtered pose data, the computing device is able to control certain operations or present content using the filtered pose data. For example, where the computing device is an XR device, the XR device renders virtual content for presentation to a user of the XR device and determines positioning of the virtual content based at least partially on the pose of the object as tracked using the filtered pose data. The XR device then causes presentation of the virtual content according to the determined positioning.

Examples described herein address technical challenges by providing reliable, robust, and/or computationally efficient computer-implemented techniques for pose smoothing. These techniques can reduce noise (e.g., static jitter) without significant adverse effects on accuracy or latency.

It can be technically challenging to achieve both high accuracy (low latency) and smoothness, since improving one may come at the expense of the other. Examples described herein make it easier to achieve these objectives by combining technical benefits of camera space filtering and world space filtering.

Uneven distribution of noise across different spatial dimensions or based on other camera-specific attributes poses a technical challenge for accurate and stable tracking, particularly when a camera is moving through space. Examples described herein apply camera space-specific filter parameters to pose data represented in the world space. This approach allows, for instance, for stronger filtering along the camera axis, where noise is typically higher, while maintaining technical benefits of world space representation. For example, the stability associated with world space representation and processing can be maintained to avoid or reduce "swimming" artifacts, while still exploiting noise characteristics that are specific to the camera's perspective.

Examples in the present disclosure improve the functioning of a computing device, such as an XR device that is configured to perform camera-based object tracking. Moreover, greater efficiency in pose filtering or enhancements in tracking performance can lead to better resource utilization in XR devices.

FIG. 1 is a network diagram illustrating a network environment 100 suitable for operating an XR device 110, according to some examples. The network environment 100 includes an XR device 110 and a server 112, communicatively coupled to each other via a network 104. The server 112 may be part of a network-based system. For example, the network-based system may be or include a cloud-based server system that provides additional information, such as virtual content (e.g., 3D models of virtual objects, or digital effects to be applied as virtual overlays onto images depicting real-world scenes) to the XR device 110.

A user 106 operates the XR device 110. The user 106 may be a human user (e.g., a human being), a machine user (e.g., a computer configured by a software program to interact with the XR device 110), or any suitable combination thereof (e.g., a human assisted by a machine or a machine supervised by a human). The user 106 is not part of the network environment 100, but is associated with the XR device 110. For example, where the XR device 110 is a head-wearable apparatus, the user 106 wears the XR device 110 during a user session.

The XR device 110 may have different display arrangements. In some examples, the display arrangement may include a screen that displays what is captured with a camera of the XR device 110. In some examples, the display of the device may be transparent or semi-transparent. In some examples, the display may be non-transparent and wearable by the user to cover the field of vision of the user.

The user 106 operates an application of the XR device 110, referred to herein as an AR application. The AR application may be configured to provide the user 106 with an experience triggered or enhanced by a physical object 108, such as a two-dimensional (2D) physical object (e.g., a picture), a 3D physical object (e.g., a statue), a location (e.g., at factory), or any references (e.g., perceived corners of walls or furniture, or Quick Response (QR) codes) in the real-world physical environment. For example, the user 106 may point a camera of the XR device 110 to capture an image of the physical object 108 and a virtual overlay may be presented over the physical object 108 via the display.

Experiences may also be triggered or enhanced by a hand or other body part of the user 106. For example, the XR device 110 detects and responds to hand gestures. The XR device 110 may also present information content or control items, such as user interface elements, to the user 106 during a user session.

The XR device 110 includes one or more tracking systems or tracking components (not shown in FIG. 1). The tracking components track the pose (e.g., position and orientation) of the XR device 110 relative to a real-world environment 102 using image sensors (e.g., depth-enabled 3D camera, or image camera), inertial sensors (e.g., gyroscope, accelerometer, or the like), wireless sensors (e.g., Bluetooth™ or Wi-Fi™), a Global Positioning System (GPS) sensor, and/or audio sensor to determine the location of the XR device 110 within the real-world environment 102. The tracking components can also track the pose of real-world objects, such as the physical object 108 or the hand of the user 106.

In some examples, the server 112 is used to detect and identify the physical object 108 based on sensor data (e.g., image and depth data) from the XR device 110, and determine a pose of the XR device 110 and the physical object 108 based on the sensor data. The server 112 can also generate a virtual object or other virtual content based, for example, on the pose of the XR device 110 and the physical object 108.

In some examples, the server 112 communicates virtual content to the XR device 110. In other examples, the XR device 110 obtains virtual content through local retrieval or generation. The XR device 110 or the server 112, or both, can perform image processing, object detection, and object tracking functions based on images captured by the XR device 110 and one or more parameters internal or external to the XR device 110.

The object recognition, tracking, and AR rendering can be performed on either the XR device 110, the server 112, or a combination between the XR device 110 and the server 112. Accordingly, while certain functions are described herein as being performed by either an XR device or a server, the location of certain functionality may be a design choice. For example, it may be technically preferable to deploy particular technology and functionality within a server system initially, but later to migrate this technology and functionality to a client installed locally at the XR device where the XR device has sufficient processing capacity.

The network 104 may be any network that enables communication between or among machines (e.g., server 112), databases, and devices (e.g., XR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
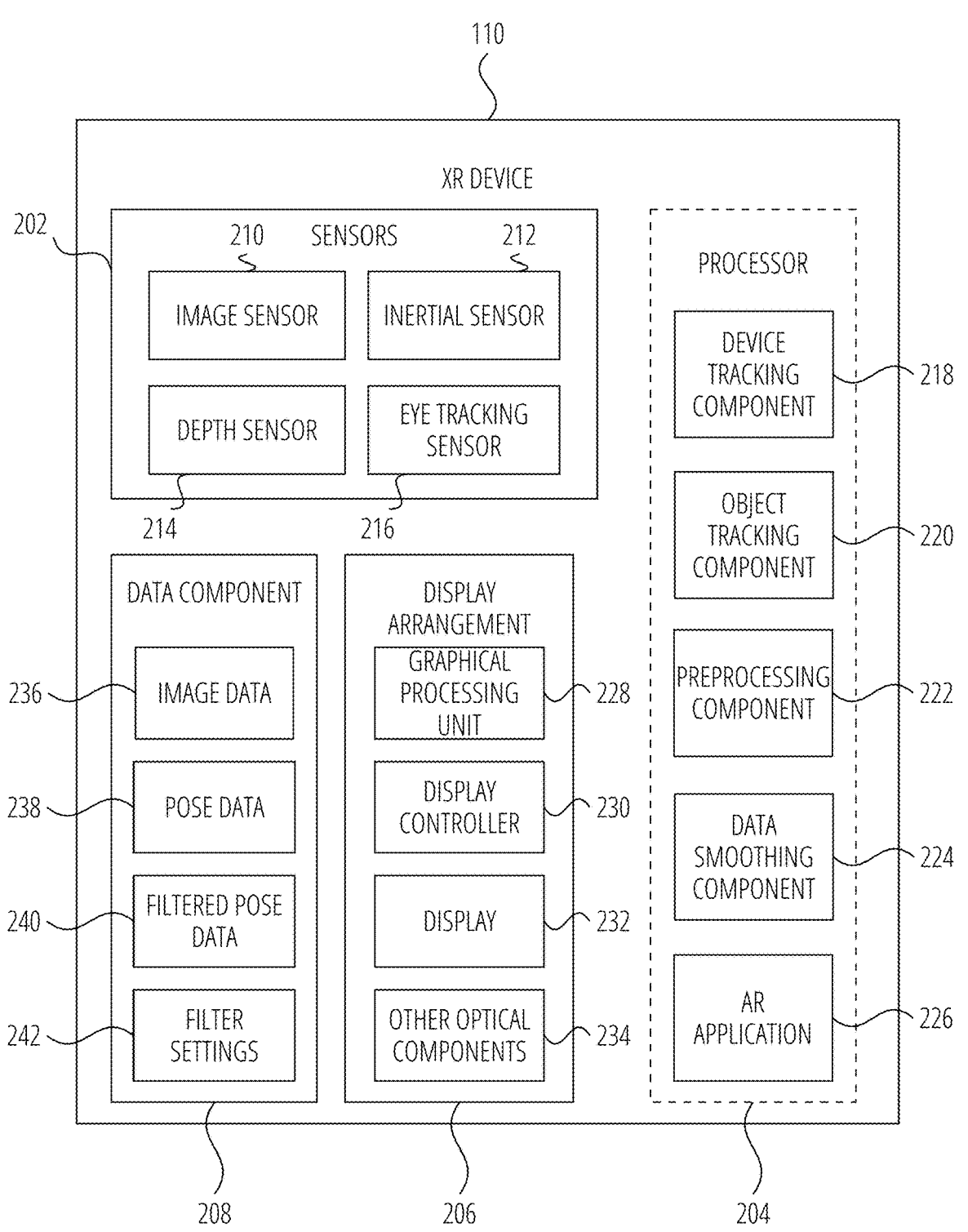
FIG. 2 is a block diagram illustrating components of an XR device, according to some examples.

FIG. 2 is a block diagram illustrating components (e.g., modules, parts, systems, or subsystems) of the XR device 110, according to some examples. The XR device 110 is shown to include sensors 202, a processor 204, a display arrangement 206, and a data component 208. It will be appreciated that FIG. 2 is not intended to provide an exhaustive indication of components of the XR device 110.

The sensors 202 include one or more image sensors 210, one or more inertial sensors 212, one or more depth sensors 214, and one or more eye tracking sensors 216. An image sensor 210 can include one or more of a color camera, a thermal camera, or a grayscale, global shutter tracking camera. The image sensors 210 may include more than one of the same cameras (e.g., multiple color cameras).

An inertial sensor 212 includes, for example, a combination of a gyroscope, accelerometer, and a magnetometer. In some examples, the inertial sensor 212 includes one or more Inertial Measurement Units (IMUs). An IMU enables tracking of movement of a body by integrating the acceleration and the angular velocity measured by the IMU. An IMU may include a combination of accelerometers and gyroscopes that can determine and quantify linear acceleration and angular velocity, respectively. The values obtained from the gyroscopes of the IMU can be processed to obtain the pitch, roll, and heading of the IMU and, therefore, of the body with which the IMU is associated. Signals from the accelerometers of the IMU also can be processed to obtain velocity and displacement. In some examples, the magnetic field is measured by the magnetometer to provide a reference for orientation, helping to correct any drift in the gyroscope and/or accelerometer measurements, thereby improving the overall accuracy and stability of the estimations.

A depth sensor 214 may include one or more of a structured-light sensor, a time-of-flight sensor, a passive stereo sensor, and an ultrasound device. The eye tracking sensor 216 is configured to monitor the gaze direction of the user, providing data for various applications, such as adjusting the focus of displayed content or determining a zone of interest in the field of view. The XR device 110 may include one or multiple eye tracking sensors 216, such as infrared eye tracking sensors, corneal reflection tracking sensors, or video-based eye-tracking sensors.

Other examples of sensors 202 include a proximity or location sensor (e.g., near field communication, GPS, Bluetooth™, Wi-Fi™), an audio sensor (e.g., a microphone), or any suitable combination thereof. It is noted that the sensors 202 described herein are for illustration purposes and the sensors 202 are thus not limited to the ones described above.

The processor 204 implements or causes execution of a device tracking component 218, an object tracking component 220, a preprocessing component 222, a data smoothing component 224, and an AR application 226.

In some examples, the device tracking component 218, or device tracking system, estimates a pose of the XR device 110. For example, the device tracking component 218 uses data from the image sensor 210 and the inertial sensor 212 to track the pose of the XR device 110 relative to a frame of reference (e.g., real-world environment 102).

In some examples, the device tracking component 218 uses tracking data to determine the pose of the XR device 110. The pose may be a determined orientation and position of the XR device 110 in relation to the user's real-world environment 102.

Accordingly, the device tracking component 218 can enable the XR device 110 to track its own pose within a world space.

In some examples, the device tracking component 218 continually gathers and uses updated sensor data describing movements of the XR device 110 to determine updated poses of the XR device 110 that indicate changes in the relative position and/or orientation of the XR device 110 from the physical objects in the real-world environment 102. Where the pose of a camera of the XR device 110 is of interest, it can be obtained based on its known position and orientation relative, for example, to an IMU or other tracking or reference component on the XR device 110.

A SLAM system or VIO system may be used in the device tracking component 218. A SLAM system may be used to understand and map a physical environment in real-time. This allows, for example, an XR device to accurately place digital objects in the real world and track their position as a user moves and/or as objects move. A VIO system combines data from an IMU and a camera to estimate the position and orientation of an object in real-time. The VIO system does not necessarily build a map, but uses visual features and inertial data to estimate motion relative to an initial pose.

The object tracking component 220 enables the tracking of an object, such as the physical object 108 of FIG. 1 or a hand of a user. The object tracking component 220 may include a computer-operated application or system that enables a device or system to track visual features identified in images captured by one or more image sensors, such as one or more cameras. In some examples, the object tracking component 220 builds a model of a real-world environment based on the tracked visual features, as described above. The object tracking component 220 may implement one or more object tracking machine learning models to detect and/or track an object in the field of view of a user during a user session.

An object tracking machine learning model may comprise a neural network trained on suitable training data to identify and track objects in a sequence of frames captured by the XR device 110. An object tracking machine learning model typically uses an object's appearance, motion, landmarks, and/or other features to estimate location in subsequent frames.

In some examples, the object tracking component 220 implements a landmark detection system (e.g., using a landmark detection machine learning model). For example, based on images captured using one or more cameras of the image sensors 210, the object tracking component 220 identifies 3D landmarks associated with joints of a hand of the user 106 of FIG. 1. In other words, the object tracking component 220 can detect and track the 3D positions of various joints (or other landmarks, such as bones or other segments of the hand) on the hand as the hand moves in the field of view of the XR device 110. In some examples, positions and orientations (e.g., relative angles) of the landmarks are tracked. It is noted that 3D positions of landmarks can also be obtained in other ways. For example, in addition to images captured using cameras, the XR device 110 can use the depth sensor 214 to identify 3D landmarks.

In some examples, the object tracking component 220 is calibrated for a specific set of features. For example, when the object tracking component 220 performs hand tracking, a calibration component calibrates the object tracking component 220 by using a hand calibration, such as a hand size calibration for a particular user of the XR device 110. The calibration component can perform one or more calibration steps to measure or estimate hand features, such as the size of a hand and/or details of hand landmarks (e.g., fingers and joints). This may include bone length calibrations.

Pose data can be transformed from the camera space, in which may be initially obtained or estimated, to the world space. For example, based on output from the device tracking component 218, the XR device 110 knows the translation (e.g., position) and rotation (e.g., orientation) of a camera of the XR device 110 in the world space. Further, based on output from the object tracking component 220, the XR device 110 has pose data for a tracked object, represented in the camera space. Accordingly, the XR device 110 knows the pose of the object relative to the camera, and also knows the pose of the camera in the world space, which allows the XR device 110 to determine the pose of the object in the world space.

For example, in the case of pose data that includes position and orientation components:

Object pose is represented as a 4×4 transformation matrix that includes the object's position and orientation relative to the camera.

The object's pose in camera space is combined with the camera's pose in world space to obtain the object's pose in world space. This may involve multiplying the object's transformation matrix by the camera's transformation matrix.

A resulting 4×4 transformation matrix represents the object's position and orientation relative to the world coordinate system. This matrix can then be used to render virtual content in the correct position and orientation within the real-world environment 102.

As another example, when dealing with pose data that includes only positional data (e.g., 3D positional coordinates):

Object pose is initially represented using 3D positions of the object in camera space.

The object pose can be translated into the world space by applying one or more translation vectors that describe the camera position in the world space.

The resulting pose data represents the object's pose in world space, which can be used to render virtual content correctly within the real-world environment 102.

In some examples, the XR device 110 is configured to filter pose data to reduce noise. The preprocessing component 222 may perform initial processing to prepare data for smoothing operations. For example, the preprocessing component 222 can convert captured image data or initial pose data from the camera space to the world space, as described above.

The data smoothing component 224 applies one or more filtering techniques to pose data. In some examples, the data smoothing component 224 runs a smoothing filter that combines benefits of camera space and world space filtering, as described elsewhere in the present disclosure. The data smoothing component 224 may dynamically adjust its filter parameters based, for example, on a current spatial relationship between the camera and the tracked object.

In some examples, the data smoothing component 224 handles input from multiple cameras (e.g., multiple image sensors 210), selecting respective parameters associated with each camera. Output of the data smoothing component 224 includes filtered pose data, which can be used by other components of the XR device 110, such as the AR application 226 or the object tracking component 220.

The AR application 226 may retrieve a virtual object (e.g., 3D object model) based on an identified physical object 108 or physical environment (or other real-world feature), or retrieve an augmentation or digital effect to apply to the physical object 108. A graphical processing unit 228 of the display arrangement 206 causes display of the virtual object, augmentation, digital effect, or the like. In some examples, the AR application 226 includes a local rendering engine that generates a visualization of a virtual object overlaid (e.g., superimposed upon, or otherwise displayed in tandem with) on an image of the physical object 108 (or other real-world feature) captured by the image sensor 210. A visualization of the virtual object may be manipulated by adjusting a position of the physical object or feature (e.g., its physical location, orientation, or both) relative to the image sensor 210. Similarly, the visualization of the virtual object may be manipulated by adjusting a pose of the XR device 110 relative to the physical object or feature.

Referring again to the graphical processing unit 228, the graphical processing unit 228 may include a render engine that is configured to render a frame of a 3D model of a virtual object based on the virtual content provided by the AR application 226 and the pose of the XR device 110 (and, in some cases, the position of a tracked object).

In some examples, the AR application 226 and/or the graphical processing unit 228 uses pose data to generate frames of virtual content to be presented on a display 232. For example, the object tracking component 220 and the data smoothing component 224 are used to track an object using filtered pose data. The graphical processing unit 228 communicates with the AR application 226 to apply the filtered pose data to render a frame of the virtual content such that the virtual content is presented at an orientation and position in the display 232 to properly augment the user's reality. As an example, the graphical processing unit 228 may use the filtered pose data to render a frame of virtual content such that, when presented on the display 232, the virtual content is caused to be presented to a user so as to overlap with a physical object in the user's real-world environment 102.

In some examples, the AR application 226 can work with the graphical processing unit 228 to generate updated frames of virtual content based on updated poses of the XR device 110 and/or updated filtered pose data for a tracked object, generated by the abovementioned components, which reflect, for example, changes in the pose of the user in relation to physical objects in the user's real-world environment 102, thereby resulting in a more immersive experience.

The graphical processing unit 228 transfers the rendered frame to a display controller 230. The display controller 230 is positioned as an intermediary between the graphical processing unit 228 and the display 232, receives the image data (e.g., rendered frame) from the graphical processing unit 228, re-projects the frame (by performing a warping process) based on a latest pose of the XR device 110 (and, in some cases, object tracking pose forecasts or predictions), and provides the re-projected frame to the display 232.

In some examples, the display 232 is not directly in the gaze path of the user. For example, the display 232 can be offset from the gaze path of the user and other optical components 234 direct light from the display 232 into the gaze path. The other optical components 234 include, for example, one or more mirrors, one or more lenses, or one or more beam splitters.

It will be appreciated that, in examples where an XR device includes multiple displays, each display can have a dedicated graphical processing unit and/or display controller. It will further be appreciated that where an XR device includes multiple displays, e.g., in the case of AR glasses or any other AR device that provides binocular vision to mimic the way humans naturally perceive the world, a left eye display arrangement and a right eye display arrangement can deliver separate images or video streams to each eye. Where an XR device includes multiple displays, steps may be carried out separately and substantially in parallel for each display, in some examples, and pairs of features or components may be included to cater for both eyes.

For example, an XR device captures separate images for a left eye display and a right eye display (or for a set of right eye displays and a set of left eye displays), and renders separate outputs for each eye to create a more immersive experience and to adjust the focus and convergence of the overall view of a user for a more natural, 3D view. Thus, while a single set of display arrangement components is shown in FIG. 2, similar techniques may be applied to cover both eyes by providing a further set of display arrangement components.

Still referring to FIG. 2, the data component 208 stores various data, such as image data 236, pose data 238, filtered pose data 240, and/or filter settings 242. The image data 236 may include image data obtained from an image sensor 210. The pose data 238 can include poses of the XR device 110 and poses of tracked objects.

In some examples, the pose data 238 includes a time series of pose data items reflecting how the pose of an object changes over time. The pose data 238 can be obtained by processing the image data 236 as described herein. The pose data 238 can initially be obtained in the camera space and transformed so as to be represented in the world space.

In some examples, the filtered pose data 240 includes pose data, represented in the world space, that has been filtered by the data smoothing component 224 to reduce noise (e.g., the filtered pose data 240 is the output from the data smoothing component 224). The filtered pose data 240 can be accessed by components such as the object tracking component 220 or the AR application 226 to track the object or to generate suitable virtual content.

The filter settings 242 may include settings, rules, parameters, and/or configurations that control the behavior of the data smoothing component 224. In some examples, the filter settings 242 includes one or more specific smoothing filters. For example, the filter settings 242 define parameters of an adaptive filter, such as a rotation transformation, a set of camera space-specific filter parameters, and a scaling factor. The filter settings 242 can further include instructions for determining when to apply a smoothing filter, how to calculate or adjust its parameters over time, or how to handle its output.

One or more of the components described herein may be implemented using hardware (e.g., a processor of a machine) or a combination of hardware and software. For example, a component described herein may configure a processor to perform the operations described herein for that component. Moreover, two or more of these components may be combined into a single component, and the functions described herein for a single component may be subdivided among multiple components. Furthermore, according to various examples, components described herein as being implemented within a single machine, database, component, or device may be distributed across multiple machines, databases, components, or devices.

Figure 3:
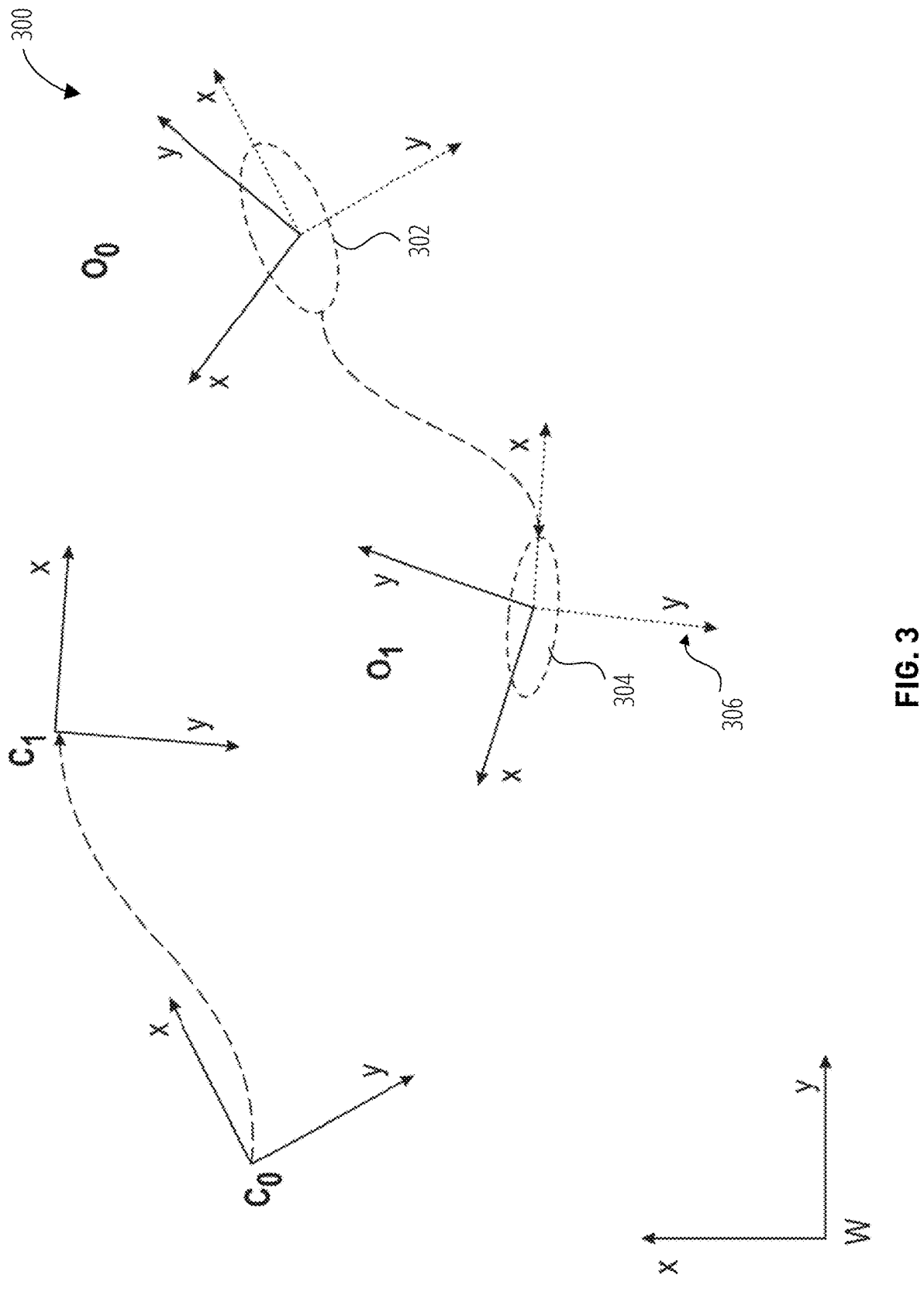
FIG. 3 diagrammatically illustrates changes in the pose of an object relative to a camera space and a world space, respectively, according to some examples.

FIG. 3 is a diagram 300 that illustrates changes in the pose of an object relative to a camera space and a world space, respectively, according to some examples. It is noted that the diagram 300 provides a simplified illustration that shows only two axes (x and y), and that a pose is commonly represented in more than two dimensions.

An object is tracked by processing images of the object as captured by a camera, such as a camera of the XR device 110. In some examples, the object is a hand that has its pose trajectory tracked by the XR device 110.

The object can be tracked in the camera space or in the world space. In the diagram 300, "W" illustrates a global coordinate system that defines the world space (e.g., relative to a fixed point in the real world), while "C" represents a coordinate system that defines the camera space. The camera space is fixed to the perspective of the camera that captures the images, but is movable within the world space according to camera movements in the real world.

At a first point in time (t=0), and as illustrated by "$C_0$" in FIG. 3, the camera space is at a first position and orientation in the world space. At the first point in time, the object has a particular pose, as represented by "$O_0$" in FIG. 3.

At a second point in time (t=1) following the first point in time, and as illustrated by "$C_1$" in FIG. 3, the camera space is at a second position and orientation within the world space, because the camera has moved in the real world between the two points in time. Similarly, the object has moved within the world space between the two points in time. Thus, at the second point in time, the object has a different pose, as represented by "$O_1$" in FIG. 3.

Pose data can be obtained as a time series of pose data items, each describing the pose of the object at a particular point in time. In some examples, the pose data is initially estimated from image frame data and is thus in the camera space.

The dashed elliptical elements in FIG. 3 conceptually illustrate noise characteristics 302 and 304 of the pose data at the first and second points in time, respectively. Specifically, the dashed elliptical elements indicate position measurement variances at each time point. There is a higher variance along the depth axis of the camera and a higher variance when the object is further away from the camera (as is the case at the first point in time when compared to the second point in time).

Figure 4:
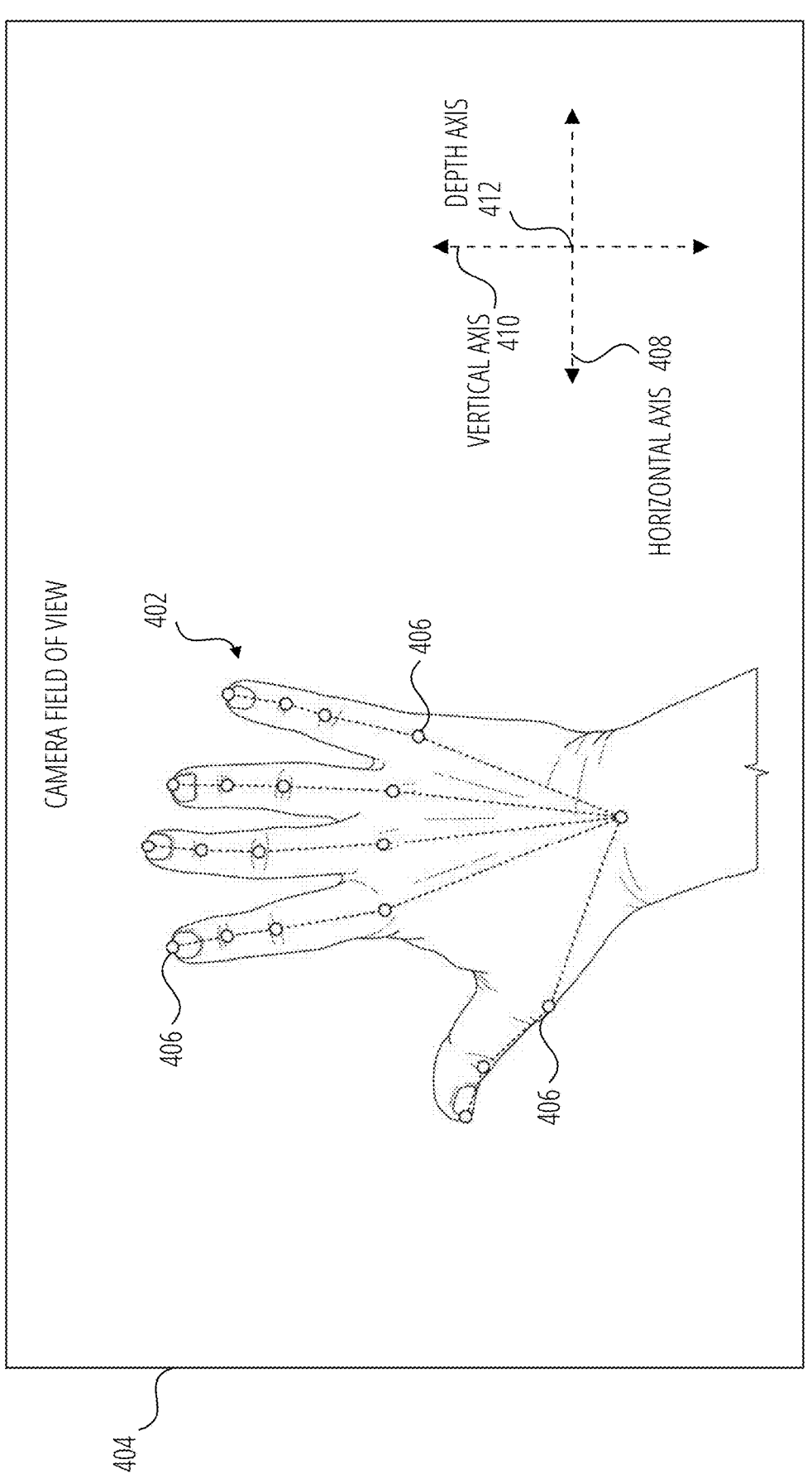
FIG. 4 is a posterior view of a hand that appears in a camera field of view of an XR device, and also shows a horizontal axis, a vertical axis, and a depth axis relative to a camera of the XR device, according to some examples.

To further illustrate the perspective of the camera, FIG. 4 shows a posterior view of a hand 402 that appears in a camera field of view 404 of an XR device, such as the XR device 110 of FIG. 1. For example, the hand 402 is a hand of the user 106 of the XR device 110, and the XR device 110 tracks various landmarks 406 on the hand 402 in order to provide an XR experience. In some examples, pose data includes at least 3D positional coordinates for landmarks such as the landmarks 406 of FIG. 4.

The camera field of view 404 captures the hand 402 along a horizontal axis 408, a vertical axis 410, and a depth axis 412, or camera axis, the latter being perpendicular to both the horizontal axis 408 and the vertical axis 410.

Referring back to FIG. 3, the noise characteristics 302, 304 of the pose data are related to the axes of the camera-fixed coordinate system of the camera space, such as the camera-fixed coordinate system 306 shown for the second point in time at pose "$O_1$" in FIG. 3. Noise can have varying levels across different axes due to camera space-specific factors. For example, and as mentioned above with reference to the dashed elliptical elements in FIG. 3, there is typically more noise along the depth axis 412 than along the horizontal axis 408 or the vertical axis 410.

Pose data can be transformed from the camera space to the world space, as illustrated by the axes in dashed lines and solid lines, respectively, at "$O_0$" and "$O_1$" in FIG. 3. This can be achieved by using, for example, techniques described with reference to FIG. 2 (e.g., by processing data from a SLAM or VIO system).

Figure 5:
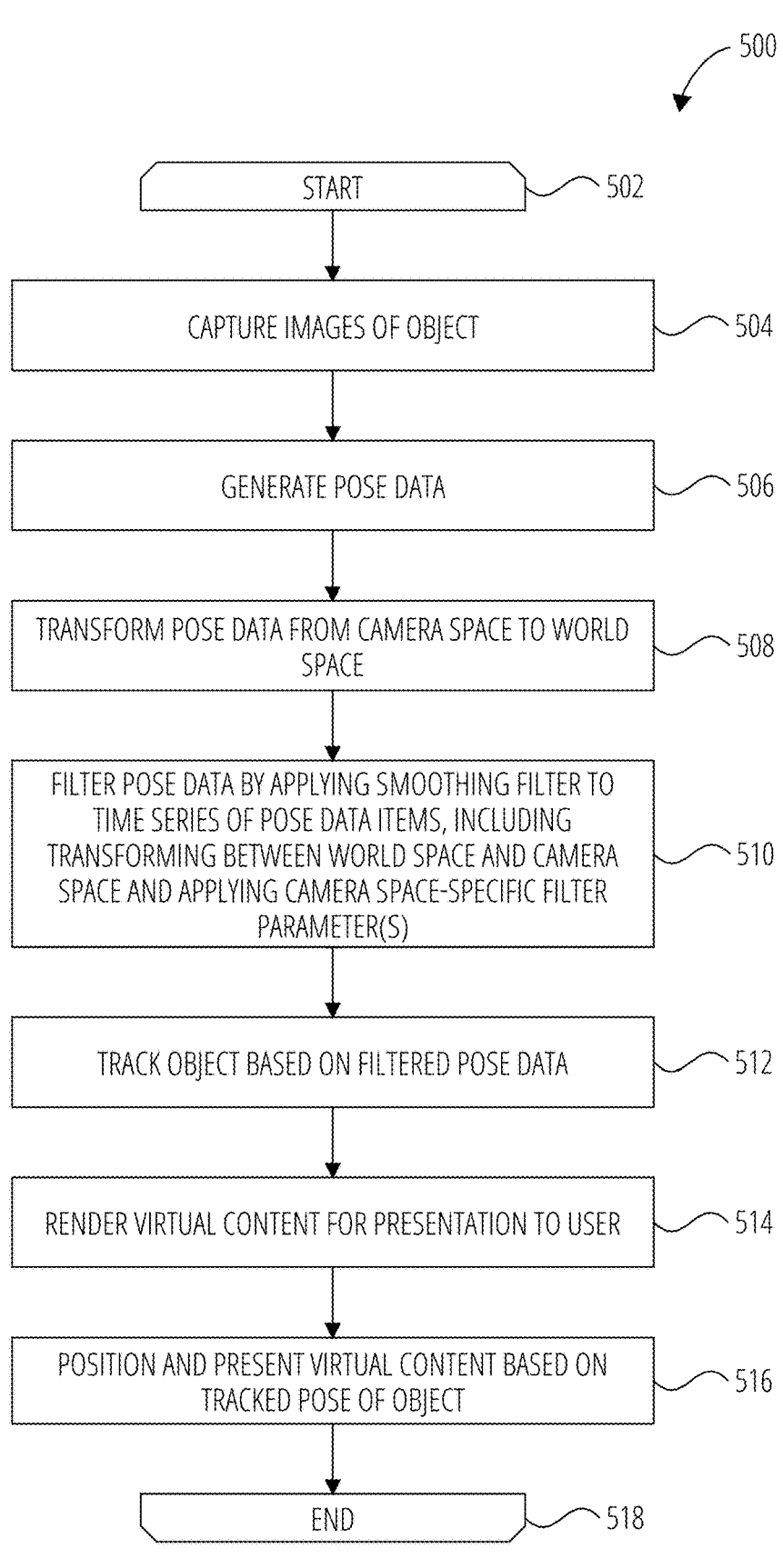
FIG. 5 is a flowchart illustrating operations of a method for filtering pose data, according to some examples.

Examples described herein, including the examples of FIG. 5 and FIG. 6, address technical challenges by avoiding the loss of camera space-specific information, such as camera orientations, when pose data is represented and filtered in the world space. This allows a computing device to apply, for example, stronger filtering parameters along a particular axis of a camera-fixed coordinate system (e.g., along the depth axis 412 of FIG. 4) even when filtering in the world space.

FIG. 5 is a flowchart illustrating operations of a method 500 for filtering pose data, according to some examples. By way of example and not limitation, aspects of the method 500 may be performed by components, devices, systems, networks, or databases shown in FIG. 1 and FIG. 2, and they may accordingly be referenced below.

The method 500 commences at opening loop operation 502. For example, the user 106 wears the XR device 110 and starts a new user session. A "user session" is used in the present disclosure to refer to an operation of an application during periods of time. For example, a user session refers to an operation of an AR application executing on a head-wearable XR device between the time the user puts on the XR device and the time the user takes off the head-wearable device. In some examples, the user session starts when the XR device is turned on or is woken up from sleep mode and stops when the XR device is turned off or placed in sleep mode. In another example, the session starts when the user runs or starts an AR application, or runs or starts a particular feature of the AR application, and stops when the user ends the AR application or stops the particular features of the AR application.

At operation 504, the XR device 110 captures images of an object, such as the hand of the user 106 or another object that is to be tracked by the XR device 110. The hand is, for example, tracked to use user gestures as input in the AR application.

At operation 506, the XR device 110 processes the image data to generate pose data for the tracked object. For example, a camera of the XR device 110 captures images of the hand of the user 106 in the field of view of the XR device 110, and processes the image frames to determine positions of joints or other landmarks on the hand (e.g., via the object tracking component 220).

The XR device 110 (e.g., via the object tracking component 220) may process the images of the hand using computer vision techniques to perform landmark detection. In other words, in some examples, raw sensor data is processed into more meaningful information that includes the tracked or estimated positions of various joints on the hand. In some examples, the XR device 110 executes a hand detection or hand tracking machine learning model.

At operation 508, the pose data is transformed from the camera space to the world space. As mentioned, a SLAM or VIO system can output data that is usable to effect this transformation. Once the pose data is represented in the world space, the data smoothing component 224 of the XR device 110 applies a smoothing filter to reduce noise.

Specifically, at operation 510, the data smoothing component 224 applies the smoothing filter to a time series of pose data items to smooth the pose data items, thereby generating filtered pose data.

The smoothing filter allows the data smoothing component 224 to apply camera space-specific filter parameters even though the pose data is represented in the world space. In this regard, a non-limiting example of a smoothing filter is discussed below.

The example smoothing filter is an adaptive filter that is based on a low-pass filter. The example smoothing filter can be defined using the formula below:

$$y_i = R_i * A * S_i * R_i^T * (x_i - y_{i-1}) + y_{i-1}$$

In the above formula:

$R_i$ is a rotation transformation in the form of a 3×3 rotation matrix representing rotation between the camera space and world space at time i;

A is a matrix representing the filter parameters;

$S_i$ is a scaling factor at time i;

$x_i$ is the input pose data at time i, expressed in the world space;

$y_{i-1}$ is the output pose data for time i−1, expressed in the world space; and $y_i$ is the output pose data for time i, expressed in the world space.

In some examples, x and y are expressed using 3D vectors, with each value representing a position in a different spatial dimension. The rotation transformation may relate a camera space coordinate system to a world space coordinate system. In some examples, the data smoothing component 224 applies the formula such that the rotation transformation transforms the filter parameter matrix A times the scaling factor $S_i$ from camera space to world space. The delta term $(x_i-y_{i-1})$ stays in the world space, where the filter parameter matrix and scaling factor are then applied thereto, and the previous output $y_{i-1}$ also stays in the world space and is added as shown in the formula to produce the output $y_i$.

In the above formula, the filter parameters are camera space-specific filter parameters that allow for stronger filtering along one or more axes relative to one or more other axes (from the camera's perspective). An example of a matrix A is the matrix diag (0.7, 0.7, 0.3), where each value is a weight, and the weight of 0.3 is applied to the depth axis (the lower value indicates the stronger filtering dimension). These parameters, when used together with the rotation transformation that accounts for the difference in orientation between the camera space (in which the parameters are represented) and the world space (in which the pose data is represented), allow for camera space filtering techniques to be applied to world space data. It is noted that the values of the filter parameters can be adjusted and the aforementioned matrix is merely an example.

Therefore, in some examples, the camera space-specific filter parameters include multiple parameters that serve as weights to be applied to respective components (e.g., dimensions) of pose data items. Each filter parameter can be associated with a respective axis in the camera space (e.g., a depth axis, a vertical axis, and a horizontal axis). In this way, the smoothing filter can operate on world space data, thus avoiding or reducing distortion issues, while not having to filter excessively and leveraging camera space noise-related properties (e.g., filtering significantly stronger along the depth axis than along the other two axes).

The scaling factor is used to adjust the filtering strength based on the distance (e.g., based on vector length) between the tracked object and the camera. The scaling factor may be a scalar or matrix (e.g., in the form of a 3×3 distance scaling matrix) that is based on the distance between the tracked object and the camera. For example, the scaling factor can be calculated as the inverse of the distance between the object and the camera at time i, thereby ensuring that stronger smoothing is applied when the object is farther from the camera (where noise would normally be higher) and less smoothing is applied when the object is closer (where measurements are normally more accurate). An example formula for the scaling factor is provided below, where $S_i$ is the scaling factor at time i, and $xInCam_i$ is the position vector of the object relative to the camera at time i:

$$S_i = \frac{1}{norm\,(xInCam_i)}$$

The method 500 proceeds to operation 512, where the XR device 110 tracks the object using the filtered pose data, which provides a smoothed estimate of object pose. The XR device renders virtual content for presentation to user 106 at operation 514, determines positioning of the virtual content based on the pose of the object as tracked using the filtered pose data, and then causes presentation of the virtual content according to the determined positioning (operation 516). The method 500 concludes at closing loop operation 518.

As mentioned, the example smoothing filter discussed above is intended to be non-limiting. Other filters may be used. For example, a 1 € ("one Euro") filter can be applied in other examples. A 1 € filter is an adaptive filter that is internally composed of two low-pass filters or parameters: one for position and one for velocity. Such a filter can be used to filter noisy signals in real-time, and its parameters can be leveraged for camera-pose dependent behavior.

FIG. 6 is a flowchart illustrating operations of a method 600 for filtering pose data, according to some examples. By way of example and not limitation, aspects of the method 600 may be performed by components, devices, systems, networks, or databases shown in FIG. 1 and FIG. 2, and they may accordingly be referenced below. Furthermore, in the method 600 of FIG. 6, and by way of example only, the XR device 110 applies the example smoothing filter formula described with reference to FIG. 5.

The method 600 commences at opening loop operation 602. For example, the user 106 wears the XR device 110 and starts a new user session. At operation 604, the XR device 110 detects an object (e.g., a hand or a full body of a person) in the field of view and starts a tracking process to track its pose.

The method 600 proceeds to operation 606, where the data smoothing component 224 of the XR device 110 performs filtering of the tracked pose data associated with a first point in time (i=1). Specifically, the XR device 110 uses the rotation matrix Ry and the scaling factor $S_1$. The rotation matrix $R_1$ represents the specific rotation between the camera of the XR device 110 and the world space at the first point in time, while the scaling factor $S_1$ accounts for the specific distance between the object and the camera at the first point in time. The XR device 110 uses these parameters, together with the matrix A (camera space-specific filter parameters), to filter the pose data that describes the pose of the object at the first point in time in the world space.

The XR device 110 continues to track the pose of the object (operation 608) to obtain further pose data. Based on any changes in the orientation of the camera within the world space, the XR device 110 updates the rotation matrix (operation 610), and based on any changes in the distance between the camera and the object as tracked by the XR device 110 (operation 612), the XR device 110 updates the scaling factor (operation 614).

For example, in a system using a SLAM or VIO approach, the rotation matrix can be continuously adjusted based on estimated camera motions. Further, the object tracking component 220 of the XR device 110 can continuously estimate the distance between the object and the camera to keep the scaling factor current.

The method 600 proceeds to operation 616, where the data smoothing component 224 of the XR device 110 performs filtering of the tracked pose data associated with a second point in time (i=2). Specifically, the XR device 110 uses the rotation matrix R2 and the scaling factor $S_2$. The rotation matrix R2 represents the specific rotation between the camera of the XR device 110 and the world space at the second point in time (which may differ from the relative rotation at the first point in time), while the scaling factor S2 accounts for the specific distance between the object and the camera at the second point in time (which may difference from the distance at the first point in time). The XR device 110 uses these parameters, together with the matrix A (camera space-specific filter parameters), to filter the pose data that describes the pose of the object at the second point in time in the world space.

As shown at operation 618, the XR device 110 continues to update the rotation matrix and the scaling factor as the object tracking process progresses. In this way, the XR device 110 ensures that the rotation matrix and the scaling factor temporally align with the pose data that is being filtered at or for a particular point in time. For instance, the rotation matrix and the scaling factor have the correct values for the particular pose data item in a time series that is being processed by the data smoothing component 224. This allows for the appropriate camera-space related parameters or effects to be taken into account. The method 600 concludes at closing loop operation 620.

Accordingly, in some examples, the adaptive nature of a filter is achieved through the incorporation of time-varying elements, such as the rotation transformation and/or scaling factor. These elements allow the filter to adjust its behavior dynamically for new measurements, taking into account aspects such as the current orientation of the camera relative to the world space and/or the distance between the camera and the tracked object.

Figure 7:
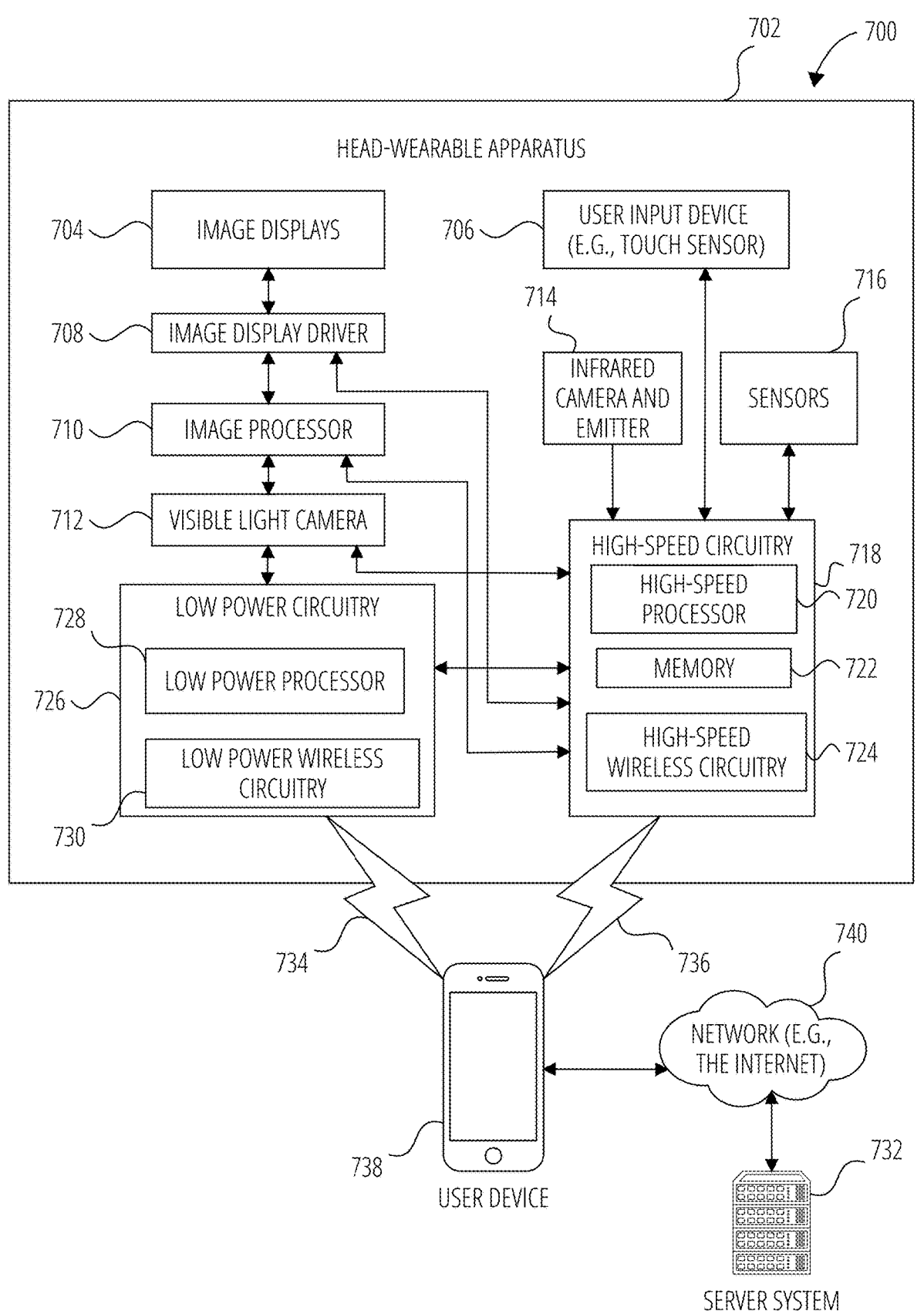
FIG. 7 illustrates a network environment in which a head-wearable apparatus can be implemented, according to some examples.

FIG. 7 illustrates a network environment 700 in which a head-wearable apparatus 702, such as a head-wearable XR device, can be implemented according to some examples. FIG. 7 provides a high-level functional block diagram of an example head-wearable apparatus 702 communicatively coupled to a mobile user device 738 and a server system 732 via a suitable network 740. One or more of the techniques described herein may be performed using the head-wearable apparatus 702 or a network of devices similar to those shown in FIG. 7.

The head-wearable apparatus 702 includes a camera, such as at least one of a visible light camera 712 and an infrared camera and emitter 714 (or multiple cameras). The head-wearable apparatus 702 includes other sensors 716, such as motion sensors or eye tracking sensors. The user device 738 can be capable of connecting with head-wearable apparatus 702 using both a communication link 734 and a communication link 736. The user device 738 is connected to the server system 732 via the network 740. The network 740 may include any combination of wired and wireless connections.

The head-wearable apparatus 702 includes a display arrangement that has several components. For example, the arrangement includes two image displays 704 of an optical assembly. The two displays include one associated with the left lateral side and one associated with the right lateral side of the head-wearable apparatus 702. The head-wearable apparatus 702 also includes an image display driver 708, an image processor 710, low power circuitry 726, and high-speed circuitry 718. The image displays 704 are for presenting images and videos, including an image that can provide a graphical user interface to a user of the head-wearable apparatus 702.

The image display driver 708 commands and controls the image display of each of the image displays 704. The image display driver 708 may deliver image data directly to each image display of the image displays 704 for presentation or may have to convert the image data into a signal or data format suitable for delivery to each image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The head-wearable apparatus 702 may include a frame and stems (or temples) extending from a lateral side of the frame, or another component to facilitate wearing of the head-wearable apparatus 702 by a user. The head-wearable apparatus 702 of FIG. 7 further includes a user input device 706 (e.g., touch sensor or push button) including an input surface on the head-wearable apparatus 702. The user input device 706 is configured to receive, from the user, an input selection to manipulate the graphical user interface of the presented image.

The components shown in FIG. 7 for the head-wearable apparatus 702 are located on one or more circuit boards, for example a printed circuit board (PCB) or flexible PCB, in the rims or temples. Alternatively, or additionally, the depicted components can be located in the chunks, frames, hinges, or bridges of the head-wearable apparatus 702. Left and right sides of the head-wearable apparatus 702 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 702 includes a memory 722 which stores instructions to perform a subset or all of the functions described herein. The memory 722 can also include a storage device. As further shown in FIG. 7, the high-speed circuitry 718 includes a high-speed processor 720, the memory 722, and high-speed wireless circuitry 724. In FIG. 7, the image display driver 708 is coupled to the high-speed circuitry 718 and operated by the high-speed processor 720 in order to drive the left and right image displays of the image displays 704. The high-speed processor 720 may be any processor capable of managing high-speed communications and operation of any general computing system needed for the head-wearable apparatus 702. The high-speed processor 720 includes processing resources needed for managing high-speed data transfers over the communication link 736 to a wireless local area network (WLAN) using high-speed wireless circuitry 724. In certain examples, the high-speed processor 720 executes an operating system such as a LINUX operating system or other such operating system of the head-wearable apparatus 702 and the operating system is stored in memory 722 for execution. In addition to any other responsibilities, the high-speed processor 720 executing a software architecture for the head-wearable apparatus 702 is used to manage data transfers with high-speed wireless circuitry 724. In certain examples, high-speed wireless circuitry 724 is configured to implement Institute of Electrical and Electronic Engineers (IEEE) 702.11 communication standards, also referred to herein as Wi-Fi™. In other examples, other high-speed communications standards may be implemented by high-speed wireless circuitry 724.

The low power wireless circuitry 730 and the high-speed wireless circuitry 724 of the head-wearable apparatus 702 can include short range transceivers (Bluetooth™) and wireless wide, local, or wide area network transceivers (e.g., cellular or Wi-Fi™). The user device 738, including the transceivers communicating via the communication link 734 and communication link 736, may be implemented using details of the architecture of the head-wearable apparatus 702, as can other elements of the network 740.

The memory 722 includes any storage device capable of storing various data and applications, including, among other things, camera data generated by the visible light camera 712, sensors 716, and the image processor 710, as well as images generated for display by the image display driver 708 on the image displays 704. While the memory 722 is shown as integrated with the high-speed circuitry 718, in other examples, the memory 722 may be an independent standalone element of the head-wearable apparatus 702. In certain such examples, electrical routing lines may provide a connection through a chip that includes the high-speed processor 720 from the image processor 710 or low power processor 728 to the memory 722. In other examples, the high-speed processor 720 may manage addressing of memory 722 such that the low power processor 728 will boot the high-speed processor 720 any time that a read or write operation involving memory 722 is needed.

As shown in FIG. 7, the low power processor 728 or high-speed processor 720 of the head-wearable apparatus 702 can be coupled to the camera (e.g., visible light camera 712, or infrared camera and emitter 714), the image display driver 708, the user input device 706 (e.g., touch sensor or push button), and the memory 722. The head-wearable apparatus 702 also includes sensors 716, which may be the motion components 1334, position components 1338, environmental components 1336, or biometric components 1332, e.g., as described below with reference to FIG. 13. In particular, motion components 1334 and position components 1338 are used by the head-wearable apparatus 702 to determine and keep track of the position and orientation of the head-wearable apparatus 702 relative to a frame of reference or another object, in conjunction with a video feed from one of the visible light cameras 712, using for example techniques such as structure from motion (SfM) or VIO.

In some examples, and as shown in FIG. 7, the head-wearable apparatus 702 is connected with a host computer. For example, the head-wearable apparatus 702 is paired with the user device 738 via the communication link 736 or connected to the server system 732 via the network 740. The server system 732 may be one or more computing devices as part of a service or network computing system, for example, that include a processor, a memory, and network communication interface to communicate over the network 740 with the user device 738 and head-wearable apparatus 702.

The user device 738 includes a processor and a network communication interface coupled to the processor. The network communication interface allows for communication over the network 740, communication link 734 or communication link 736. The user device 738 can further store at least portions of the instructions for implementing functionality described herein.

Output components of the head-wearable apparatus 702 include visual components, such as a display (e.g., one or more liquid-crystal display (LCD)), one or more plasma display panel (PDP), one or more light emitting diode (LED) display, one or more projector, or one or more waveguide. The image displays 704 of the optical assembly are driven by the image display driver 708. The output components of the head-wearable apparatus 702 may further include acoustic components (e.g., speakers), haptic components (e.g., a vibratory motor), other signal generators, and so forth. The input components of the head-wearable apparatus 702, the user device 738, and server system 732, such as the user input device 706, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 702 may optionally include additional peripheral device elements. Such peripheral device elements may include biometric sensors, additional sensors, or display elements integrated with the head-wearable apparatus 702. For example, peripheral device elements may include any input/output (I/O) components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi™ or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 736 from the user device 738 via the low power wireless circuitry 730 or high-speed wireless circuitry 724.

Any biometric data collected by biometric components is captured and stored only after explicit user approval and deleted on user request. Further, such biometric data is used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Figure 8:
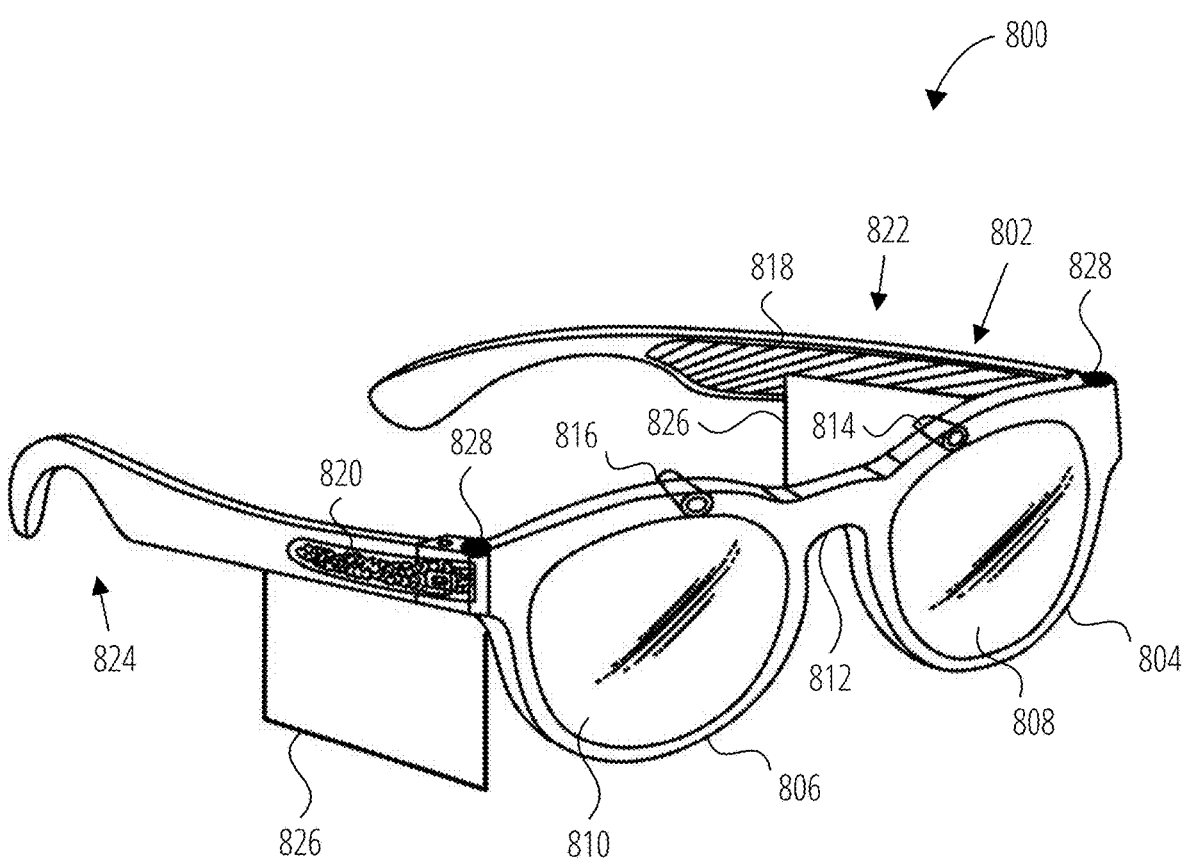
FIG. 8 is a perspective view of a head-worn device, in accordance with some examples.

FIG. 8 is a perspective view of a head-worn XR device in the form of glasses 800, according to some examples. The glasses 800 can include a frame 802 made from any suitable material such as plastic or metal, including any suitable shape memory alloy. In one or more examples, the frame 802 includes a first or left optical element holder 804 (e.g., a display or lens holder) and a second or right optical element holder 806 connected by a bridge 812. A first or left optical element 808 and a second or right optical element 810 can be provided within respective left optical element holder 804 and right optical element holder 806. The right optical element 810 and the left optical element 808 can be a lens, a display, a display assembly, or a combination of the foregoing. Any suitable display assembly can be provided in the glasses 800.

The frame 802 additionally includes a left arm or temple piece 822 and a right arm or temple piece 824. In some examples the frame 802 can be formed from a single piece of material so as to have a unitary or integral construction.

The glasses 800 can include a computing device, such as a computer 820, which can be of any suitable type so as to be carried by the frame 802 and, in one or more examples, of a suitable size and shape, so as to be partially disposed in one of the temple piece 822 or the temple piece 824. The computer 820 can include one or more processors with memory, wireless communication circuitry, and a power source. The computer 820 may comprise low-power circuitry, high-speed circuitry, and a display processor. Various other examples may include these elements in different configurations or integrated together in different ways.

The computer 820 additionally includes a battery 818 or other suitable portable power supply. In some examples, the battery 818 is disposed in left temple piece 822 and is electrically coupled to the computer 820 disposed in the right temple piece 824. The glasses 800 can include a connector or port (not shown) suitable for charging the battery 818, a wireless receiver, transmitter or transceiver (not shown), or a combination of such devices.

The glasses 800 include a first or left camera 814 and a second or right camera 816. Although two cameras are depicted, other examples contemplate the use of a single or additional (i.e., more than two) cameras. In one or more examples, the glasses 800 include any number of input sensors or other input/output devices in addition to the left camera 814 and the right camera 816. Such sensors or input/output devices can additionally include biometric sensors, location sensors, motion sensors, and so forth.

In some examples, the left camera 814 and the right camera 816 provide video frame data for use by the glasses 800 to extract 3D information (for example) from a real world scene. The glasses 800 may also include a touchpad 826 mounted to or integrated with one or both of the left temple piece 822 and right temple piece 824. The touchpad 826 is generally vertically-arranged, approximately parallel to a user's temple in some examples. As used herein, generally vertically aligned means that the touchpad is more vertical than horizontal, although potentially more vertical than that. Additional user input may be provided by one or more buttons 828, which in the illustrated examples are provided on the outer upper edges of the left optical element holder 804 and right optical element holder 806. The one or more touchpads 826 and buttons 828 provide a means whereby the glasses 800 can receive input from a user of the glasses 800.

Figure 9:
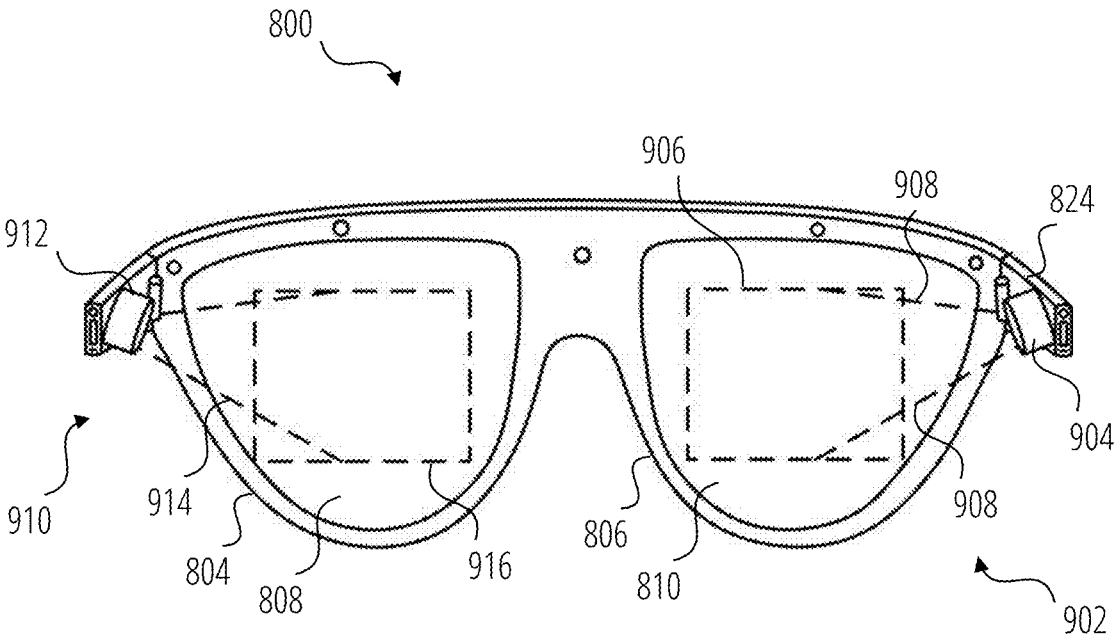
FIG. 9 illustrates a further view of the head-worn device of FIG. 8, in accordance with some examples.

FIG. 9 illustrates the glasses 800 from the perspective of a user. For clarity, a number of the elements shown in FIG. 8 have been omitted. As described with reference to FIG. 8, the glasses 800 shown in FIG. 9 include left optical element 808 and right optical element 810 secured within the left optical element holder 804 and the right optical element holder 806 respectively.

The glasses 800 include forward optical assembly 902 comprising a right projector 904 and a right near eye display 906, and a forward optical assembly 910 including a left projector 912 and a left near eye display 916.

In some examples, the near eye displays are waveguides. The waveguides include reflective or diffractive structures (e.g., gratings and/or optical elements such as mirrors, lenses, or prisms). Light 908 emitted by the projector 904 encounters the diffractive structures of the waveguide of the near eye display 906, which directs the light towards the right eye of a user to provide an image on or in the right optical element 810 that overlays the view of the real world seen by the user. Similarly, light 914 emitted by the projector 912 encounters the diffractive structures of the waveguide of the near eye display 916, which directs the light towards the left eye of a user to provide an image on or in the left optical element 808 that overlays the view of the real world seen by the user.

In some examples, the combination of a graphics processing unit (GPU), the forward optical assembly 902, the left optical element 808, and the right optical element 810 provide an optical engine of the glasses 800. The glasses 800 use the optical engine to generate an overlay of the real world view of the user including display of a 3D user interface to the user of the glasses 800.

It will be appreciated however that other display technologies or configurations may be utilized within an optical engine to display an image to a user in the user's field of view. For example, instead of a projector 904 and a waveguide, an LCD, LED or other display panel or surface may be provided.

In use, a user of the glasses 800 will be presented with information, content, and various 3D user interfaces on the near eye displays. As described in more detail herein, the user can then interact with the glasses 800 using a touchpad 826 and/or the buttons 828, voice inputs or touch inputs on an associated device, and/or hand movements, locations, and positions detected by the glasses 800.

Figure 10:
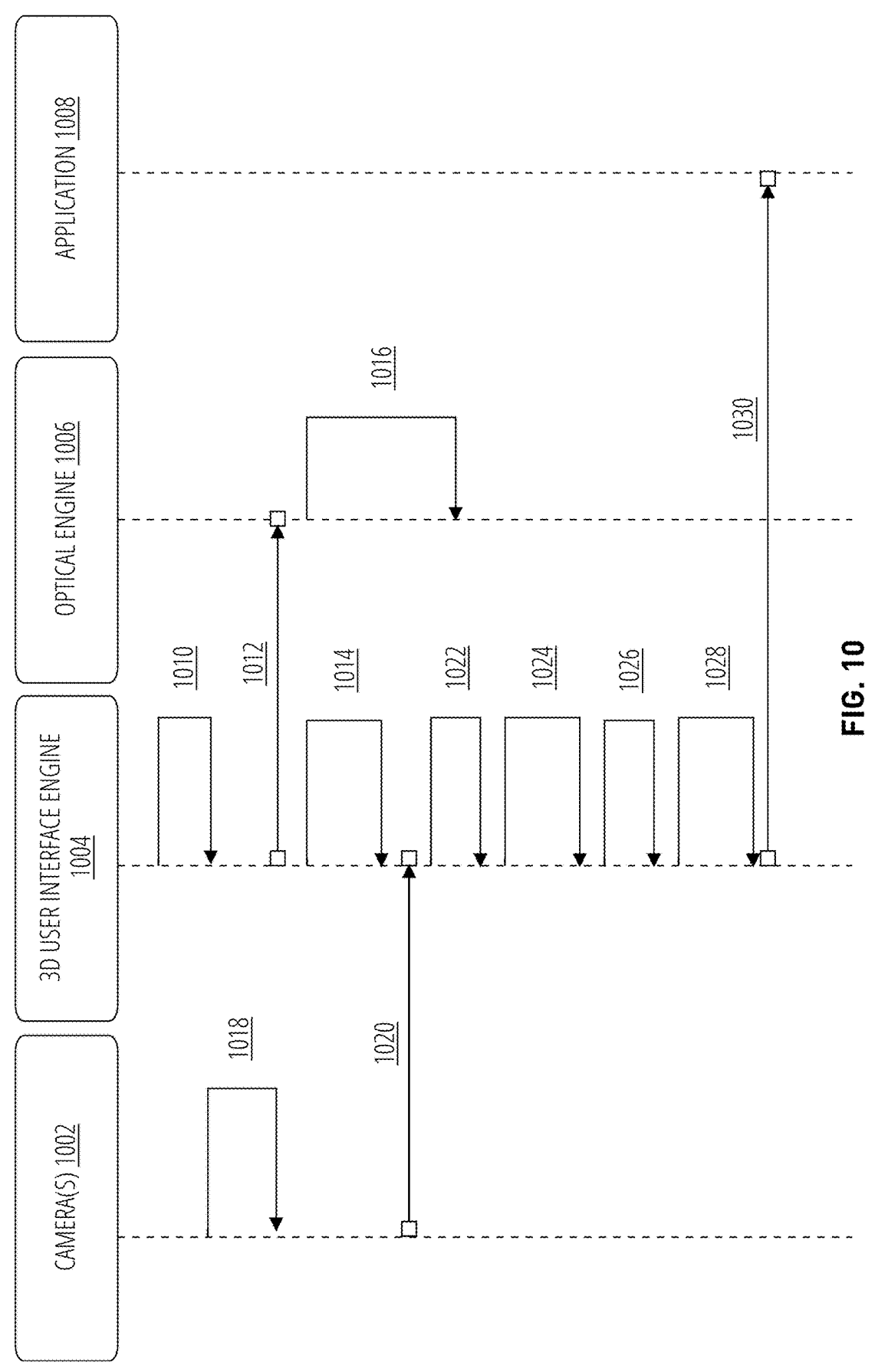
FIG. 10 illustrates a three-dimensional (3D) user interface generation and utilization process in accordance with some examples.
Figure 11:
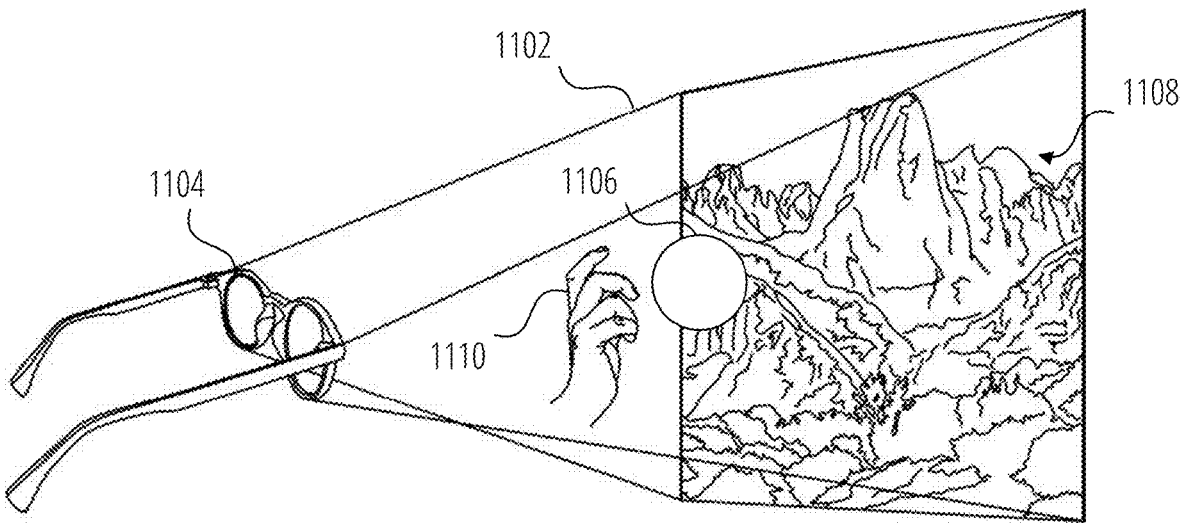
FIG. 11 illustrates a 3D user interface in accordance with some examples.

Referring now to FIG. 10 and FIG. 11, FIG. 10 depicts a sequence diagram of an example 3D user interface process and FIG. 11 depicts a 3D user interface 1102 of glasses 1104 in accordance with some examples. During the process, a 3D user interface engine 1004 generates 1010 the 3D user interface 1102 including one or more virtual objects 1106 that constitute interactive elements of the 3D user interface 1102.

A virtual object may be described as a solid in a 3D geometry having values in 3-tuples of X (horizontal), Y (vertical), and Z (depth). A 3D render of the 3D user interface 1102 is generated and 3D render data 1012 is communicated to an optical engine 1006 of the glasses 1104 and displayed 1016 to a user of the glasses 1104. The 3D user interface engine 1004 generates 1014 one or more virtual object colliders for the one or more virtual objects. One or more camera(s) 1002 of the glasses 1104 generate 1018 real world video frame data 1020 of the real world 1108 as viewed by the user of the glasses 1104.

Included in the real world video frame data 1020 is hand position video frame data of one or more of the user's hands 1110 from a viewpoint of the user while wearing the glasses 1104 and viewing the projection of the 3D render of the 3D user interface 1102 by the optical engine 1006. Thus the real world video frame data 1020 include hand location video frame data and hand position video frame data of the user's hands 1110 as the user makes movements with their hands.

The 3D user interface engine 1004 or other components of the glasses 1104 utilize the hand location video frame data and hand position video frame data in the real world video frame data 1020 to extract landmarks 1022 of the user's hands 1110 from the real world video frame data 1020 and generates 1024 landmark colliders for one or more landmarks on one or more of the user's hands 1110.

The landmark colliders are used to determine user interactions between the user and the virtual object by detecting collisions 1026 between the landmark colliders and respective visual object colliders of the virtual objects. The collisions are used by the 3D user interface engine 1004 to determine user interactions 1028 by the user with the virtual objects. The 3D user interface engine 1004 communicates user interaction data 1030 of the user interactions to an application 1008 for utilization by the application 1008.

In some examples, the application 1008 performs the functions of the 3D user interface engine 1004 by utilizing various APIs and system libraries to receive and process the real world video frame data 1020 and instruct the optical engine 1006.

In some examples, a user wears one or more sensor gloves or other sensors on the user's hands that generate sensed hand position data and sensed hand location data that is used to generate the landmark colliders. The sensed hand position data and sensed hand location data are communicated to the 3D user interface engine 1004 and used by the 3D user interface engine 1004 in lieu of or in combination with the hand location video frame data and hand position video frame data to generate landmark colliders for one or more landmarks on one or more of the user's hands 1110.

Figure 12:
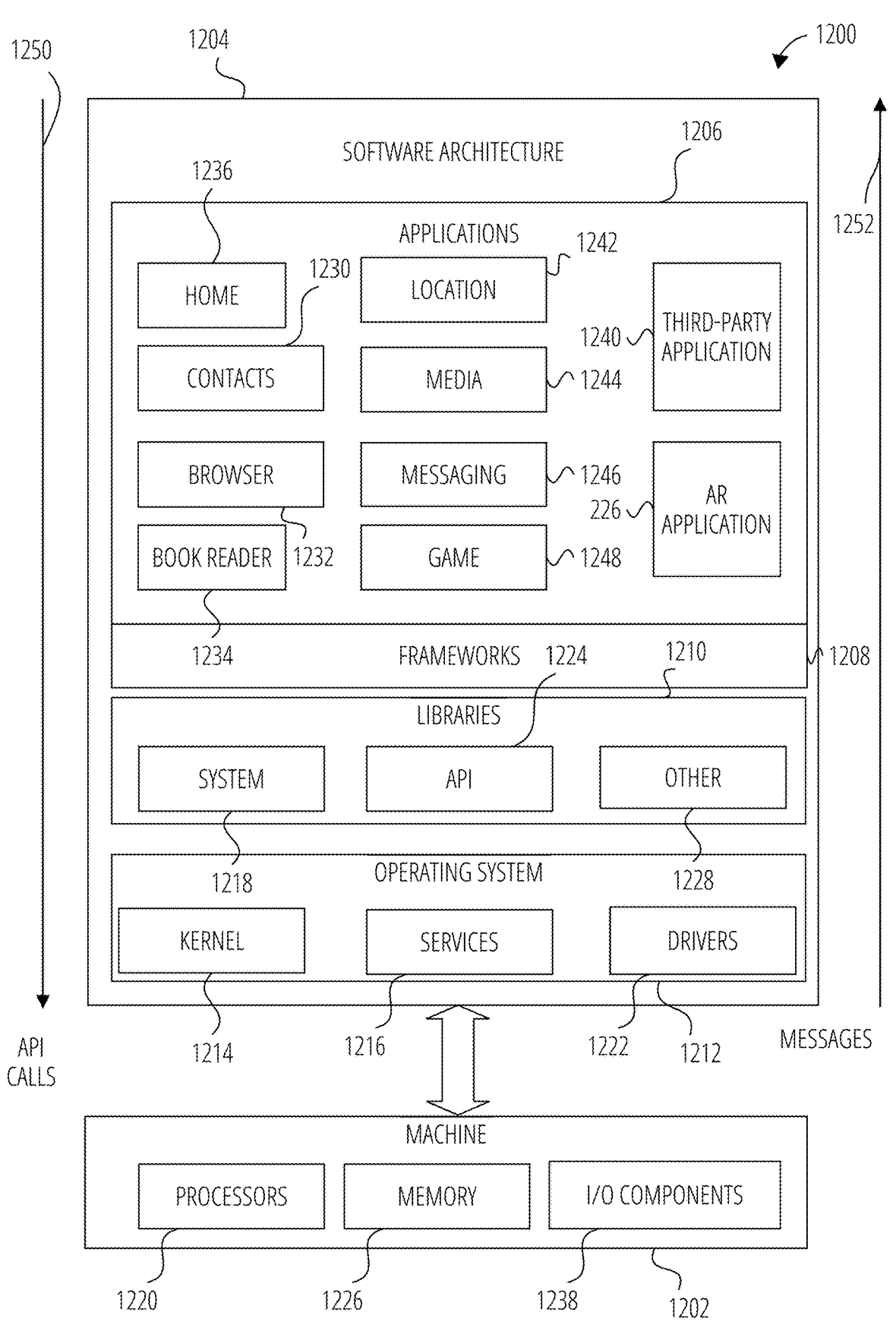
FIG. 12 is a block diagram showing a software architecture within which the present disclosure may be implemented, according to some examples.

FIG. 12 is a block diagram 1200 illustrating a software architecture 1204, which can be installed on one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250, through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, Bluetooth™ or Bluetooth™ Low Energy drivers, flash memory drivers, serial communication drivers (e.g., Universal Serial Bus (USB) drivers), WI-FI™ drivers, audio drivers, power management drivers, and so forth.

The libraries 1210 provide a low-level common infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a high-level common infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In some examples, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In some examples, the third-party application 1240 (e.g., an Application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 12, the third-party application 1240 can invoke the API calls 1250 provided by the operating system 1212 to facilitate functionality described herein. The applications 1206 may include an AR application such as the AR application 226 described herein, according to some examples.

Figure 13:
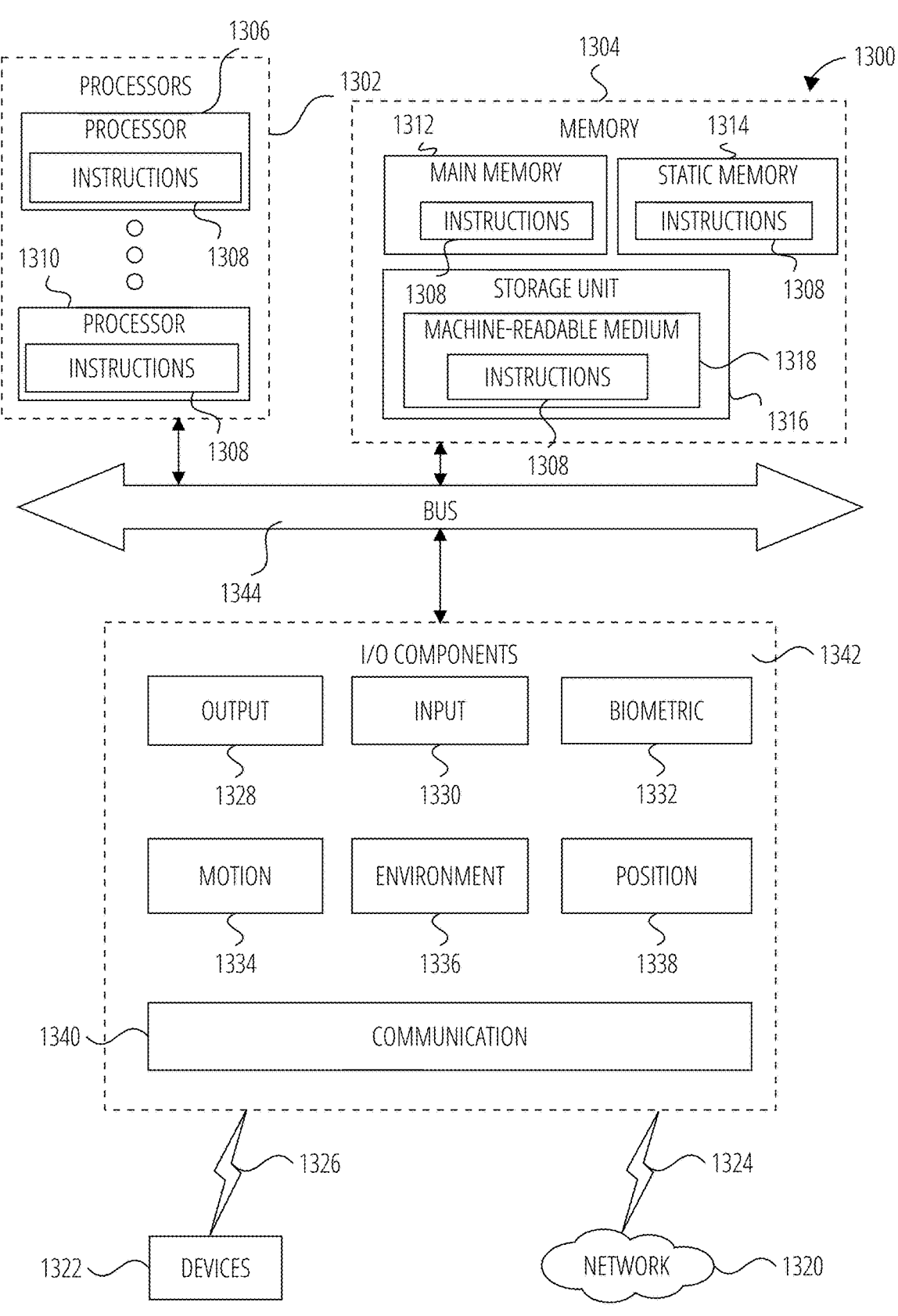
FIG. 13 is a diagrammatic representation of a machine in the form of a computer system within which a set of instructions may be executed for causing the machine to perform any one or more of the methodologies discussed herein, according to some examples.

FIG. 13 is a diagrammatic representation of a machine 1300 within which instructions 1308 (e.g., software, a program, an application, an applet, or other executable code) for causing the machine 1300 to perform one or more of the methodologies discussed herein may be executed. For example, the instructions 1308 may cause the machine 1300 to execute any one or more of the methods described herein.

The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), XR device, a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein.

The machine 1300 may include processors 1302, memory 1304, and I/O components 1342, which may be configured to communicate with each other via a bus 1344. In some examples, the processors 1302 may include, for example, a processor 1306 and a processor 1310 that execute the instructions 1308. Although FIG. 13 shows multiple processors 1302, the machine 1300 may include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, accessible to the processors via the bus 1344. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the processors, or any suitable combination thereof, during execution thereof by the machine 1300.

The I/O components 1342 may include a wide variety of components to receive input, provide output, produce output, transmit information, exchange information, capture measurements, and so on. The specific I/O components 1342 that are included in a particular machine will depend on the type of machine. For example, portable machines such as mobile phones may include a touch input device or other such input mechanisms, while a headless server machine will likely not include such a touch input device. It will be appreciated that the I/O components 1342 may include many other components that are not shown in FIG. 13. In various examples, the I/O components 1342 may include output components 1328 and input components 1330.

The output components 1328 may include visual components (e.g., a display such as a PDP, an LED display, a LCD, a projector, or a cathode ray tube (CRT)), acoustic components (e.g., speakers), haptic components (e.g., a vibratory motor, resistance mechanisms), other signal generators, and so forth. The input components 1330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1342 may include biometric components 1332, motion components 1334, environmental components 1336, or position components 1338, among a wide array of other components. For example, the biometric components 1332 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth. The environmental components 1336 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 include location sensor components (e.g., a GPS receiver components), altitude sensor components (e.g., altimeters or barometers that detect air pressure from which altitude may be derived), orientation sensor components (e.g., magnetometers), and the like.

As mentioned, any biometric data collected by biometric components is captured and stored only after explicit user approval and deleted on user request. Further, such biometric data is used for very limited purposes, such as identification verification. To ensure limited and authorized use of biometric information and other PII, access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1342 further include communication components 1340 operable to couple the machine 1300 to a network 1320 or devices 1322 via a coupling 1324 and a coupling 1326, respectively. For example, the communication components 1340 may include a network interface component or another suitable device to interface with the network 1320. In further examples, the communication components 1340 may include wired communication components, wireless communication components, cellular communication components, Near Field Communication (NFC) components, Bluetooth™ components, Wi-Fi™ components, and other communication components to provide communication via other modalities. The devices 1322 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi™ signal triangulation, location via detecting an NFC beacon signal that may indicate a particular location, and so forth.

The various memories (e.g., memory 1304, main memory 1312, static memory 1314, and/or memory of the processors 1302) and/or storage unit 1316 may store one or more sets of instructions and data structures (e.g., software) embodying or used by any one or more of the methodologies or functions described herein. These instructions (e.g., the instructions 1308), when executed by processors 1302, cause various operations to implement the disclosed examples.

The instructions 1308 may be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1308 may be transmitted or received using a transmission medium via the coupling 1326 (e.g., a peer-to-peer coupling) to the devices 1322.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1300, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

CONCLUSION

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a GPU, a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), an FPGA, a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, Very Long Instruction Word (VLIW), vector processing, or Single Instruction, Multiple Data (SIMD) that allow each core to run separate instruction streams concurrently. A processor may be emulated in software, running on a physical processor, as a virtual processor or virtual circuit. The virtual processor may behave like an independent processor but is implemented in software rather than hardware.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used herein, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is a method for facilitating object tracking, the method performed by a computing device and comprising: capturing, via one or more cameras of the computing device, a plurality of images of an object; processing the plurality of images to obtain first pose data indicative of a pose of the object over time and represented in a camera space that is defined by a first coordinate system; transforming the first pose data to second pose data represented in a world space that is defined by a second coordinate system; filtering the second pose data using a smoothing filter to generate filtered pose data, the filtering of the second pose data comprising, for each pose data item in a time series of the second pose data, using a rotation transformation between the world space and the camera space to apply one or more camera space-specific filter parameters to the pose data item that is represented in the world space; and dynamically tracking the pose of the object based on the filtered pose data.

In Example 2, the subject matter of Example 1 includes, wherein the one or more camera space-specific filter parameters comprise a plurality of camera space-specific filter parameters, at least a first parameter of the plurality of camera space-specific filter parameters providing stronger filtering than at least a second parameter of the plurality of camera space-specific filter parameters.

In Example 3, the subject matter of Example 2 includes, wherein each of the plurality of camera space-specific filter parameters is associated with a respective axis of the first coordinate system defining the camera space.

In Example 4, the subject matter of Example 3 includes, wherein the first coordinate system includes a depth axis, and the first parameter causes the stronger filtering along the depth axis than along other axes of the first coordinate system.

In Example 5, the subject matter of any of Examples 3-4 includes, wherein each of the plurality of camera space-specific filter parameters comprises weights to be applied to a component of each pose data item in the time series, the component being associated with the respective axis.

In Example 6, the subject matter of any of Examples 1-5 includes, wherein the rotation transformation accounts for orientation of the first coordinate system relative to the second coordinate system, the method further comprising: tracking a pose of the computing device in the world space; and dynamically updating the rotation transformation based on the pose of the computing device.

In Example 7, the subject matter of any of Examples 1-6 includes, wherein the smoothing filter incorporates one or more scaling factors that adjust the filtering based on a distance between the object and the one or more cameras, the method further comprising: tracking the distance between the object and the one or more cameras; and dynamically updating the one or more scaling factors based on the distance.

In Example 8, the subject matter of any of Examples 1-7 includes, wherein the computing device is an XR device that comprises the one or more cameras, and the method is performed while the XR device is worn by a user.

In Example 9, the subject matter of Example 8 includes, wherein the second coordinate system is defined in relation to a fixed point in a real-world environment in which the XR device is located while performing the object tracking, and the first coordinate system is movable relative to the second coordinate system as a result of movement of the XR device within the real-world environment.

In Example 10, the subject matter of any of Examples 1-9 includes, wherein the object is a hand.

In Example 11, the subject matter of any of Examples 1-10 includes, wherein the one or more cameras comprises a plurality of cameras, and wherein at least one of the rotation transformation or the one or more camera space-specific filter parameters is different for each respective camera of the plurality of cameras.

In Example 12, the subject matter of any of Examples 1-11 includes, wherein each pose data item in the time series comprises one or more positional coordinates represented in the world space.

In Example 13, the subject matter of any of Examples 1-12 includes, wherein, for a current pose data item in the time series, the rotation transformation and the one or more camera space-specific filter parameters are applied to input data comprising both the current pose data item and previous output data of the filtering corresponding to a previous pose data item in the time series.

In Example 14, the subject matter of any of Examples 1-13 includes, executing a device tracking system to track a pose of the computing device in the world space.

In Example 15, the subject matter of Example 14 includes, wherein the transforming of the first pose data to the second pose data comprises using the device tracking system to generate the second pose data.

In Example 16, the subject matter of any of Examples 1-15 includes, wherein the computing device is an XR device, the method further comprising: rendering virtual content for presentation to a user of the XR device; determining positioning of the virtual content based at least partially on the pose of the object as tracked using the filtered pose data; and causing presentation of the virtual content according to the determined positioning.

In Example 17, the subject matter of any of Examples 1-16 includes, wherein the smoothing filter comprises an adaptive filter.

In Example 18, the subject matter of Example 17 includes, wherein the adaptive filter comprises, or is based on, a low-pass filter.

Example 19 is an XR device comprising: one or more cameras; one or more processors; and at least one memory storing instructions that, when executed by the one or more processors, cause the XR device to perform operations comprising: capturing, via the one or more cameras, a plurality of images of an object; processing the plurality of images to obtain first pose data indicative of a pose of the object over time and represented in a camera space that is defined by a first coordinate system; transforming the first pose data to second pose data represented in a world space that is defined by a second coordinate system; filtering the second pose data using a smoothing filter to generate filtered pose data, the filtering of the second pose data comprising, for each pose data item in a time series of the second pose data, using a rotation transformation between the world space and the camera space to apply one or more camera space-specific filter parameters to the pose data item that is represented in the world space; and dynamically tracking the pose of the object based on the filtered pose data.

Example 20 is one or more non-transitory computer-readable storage media, the one or more non-transitory computer-readable storage media including instructions that, when executed by at least one processor, cause the at least one processor to perform operations comprising: obtaining, via one or more cameras, a plurality of images of an object; processing the plurality of images to obtain first pose data indicative of a pose of the object over time and represented in a camera space that is defined by a first coordinate system; transforming the first pose data to second pose data represented in a world space that is defined by a second coordinate system; filtering the second pose data using a smoothing filter to generate filtered pose data, the filtering of the second pose data comprising, for each pose data item in a time series of the second pose data, using a rotation transformation between the world space and the camera space to apply one or more camera space-specific filter parameters to the pose data item that is represented in the world space; and dynamically tracking the pose of the object based on the filtered pose data.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. A method for facilitating object tracking, the method performed by a computing device and comprising:
  capturing, via one or more cameras of the computing device, a plurality of images of an object;
  processing the plurality of images to obtain first pose data indicative of a pose of the object over time and represented in a camera space that is defined by a first coordinate system;
  transforming the first pose data to second pose data represented in a world space that is defined by a second coordinate system;
  filtering the second pose data using a smoothing filter to generate filtered pose data, the filtering of the second pose data comprising, for each pose data item in a time series of the second pose data, using a rotation transformation between the world space and the camera space to apply a plurality of camera space-specific filter parameters to the pose data item that is represented in the world space, each of the plurality of camera space-specific filter parameters being associated with a respective axis of the first coordinate system defining the camera space, and at least a first parameter of the plurality of camera space-specific filter parameters providing stronger filtering than at least a second parameter of the plurality of camera space-specific filter parameters; and
  dynamically tracking the pose of the object based on the filtered pose data.

2. The method of claim 1, wherein the first coordinate system includes a depth axis, and the first parameter causes the stronger filtering along the depth axis than along other axes of the first coordinate system.

3. The method of claim 1, wherein each of the plurality of camera space-specific filter parameters comprises weights to be applied to a component of each pose data item in the time series, the component being associated with the respective axis.

4. The method of claim 1, wherein the rotation transformation accounts for orientation of the first coordinate system relative to the second coordinate system, the method further comprising:
  tracking a pose of the computing device in the world space; and
  dynamically updating the rotation transformation based on the pose of the computing device.

5. The method of claim 1, wherein the smoothing filter incorporates one or more scaling factors that adjust the filtering based on a distance between the object and the one or more cameras, the method further comprising:

tracking the distance between the object and the one or more cameras; and dynamically updating the one or more scaling factors based on the distance.

6. The method of claim 1, wherein the computing device is an extended reality (XR) device that comprises the one or more cameras, and the method is performed while the XR device is worn by a user.

7. The method of claim 6, wherein the second coordinate system is defined in relation to a fixed point in a real-world environment in which the XR device is located while performing the object tracking, and the first coordinate system is movable relative to the second coordinate system as a result of movement of the XR device within the real-world environment.

8. The method of claim 1, wherein the object is a hand.

9. The method of claim 1, wherein the one or more cameras comprises a plurality of cameras, and wherein at least one of the rotation transformation or the plurality of camera space-specific filter parameters is different for each respective camera of the plurality of cameras.

10. The method of claim 1, wherein each pose data item in the time series comprises one or more positional coordinates represented in the world space.

11. The method of claim 1, wherein, for a current pose data item in the time series, the rotation transformation and the plurality of camera space-specific filter parameters is applied to input data comprising both the current pose data item and previous output data of the filtering corresponding to a previous pose data item in the time series.

12. The method of claim 1, further comprising executing a device tracking system to track a pose of the computing device in the world space.

13. The method of claim 12, wherein the transforming of the first pose data to the second pose data comprises using the device tracking system to generate the second pose data.

14. The method of claim 1, wherein the computing device is an extended reality (XR) device, the method further comprising:

rendering virtual content for presentation to a user of the XR device;

determining positioning of the virtual content based at least partially on the pose of the object as tracked using the filtered pose data; and causing presentation of the virtual content according to the determined positioning.

15. The method of claim 1, wherein the smoothing filter comprises an adaptive filter.

16. The method of claim 15, wherein the adaptive filter comprises, or is based on, a low-pass filter.

17. An extended reality (XR) device comprising:

one or more cameras;

one or more processors; and at least one memory storing instructions that, when executed by the one or more processors, cause the XR device to perform operations comprising:

capturing, via the one or more cameras, a plurality of images of an object;

processing the plurality of images to obtain first pose data indicative of a pose of the object over time and represented in a camera space that is defined by a first coordinate system;

transforming the first pose data to second pose data represented in a world space that is defined by a second coordinate system;

filtering the second pose data using a smoothing filter to generate filtered pose data, the filtering of the second pose data comprising, for each pose data item in a time series of the second pose data, using a rotation transformation between the world space and the camera space to apply a plurality of camera space-specific filter parameters to the pose data item that is represented in the world space, each of the plurality of camera space-specific filter parameters being associated with a respective axis of the first coordinate system defining the camera space, and at least a first parameter of the plurality of camera space-specific filter parameters providing stronger filtering than at least a second parameter of the plurality of camera space-specific filter parameters; and dynamically tracking the pose of the object based on the filtered pose data.

18. One or more non-transitory computer-readable storage media, the one or more non-transitory computer-readable storage media including instructions that, when executed by at least one processor, cause the at least one processor to perform operations comprising:

obtaining, via one or more cameras, a plurality of images of an object;

processing the plurality of images to obtain first pose data indicative of a pose of the object over time and represented in a camera space that is defined by a first coordinate system;

transforming the first pose data to second pose data represented in a world space that is defined by a second coordinate system;

filtering the second pose data using a smoothing filter to generate filtered pose data, the filtering of the second pose data comprising, for each pose data item in a time series of the second pose data, using a rotation transformation between the world space and the camera space to apply a plurality of camera space-specific filter parameters to the pose data item that is represented in the world space, each of the plurality of camera space-specific filter parameters being associated with a respective axis of the first coordinate system defining the camera space, and at least a first parameter of the plurality of camera space-specific filter parameters providing stronger filtering than at least a second parameter of the plurality of camera space-specific filter parameters; and dynamically tracking the pose of the object based on the filtered pose data.

19. The XR device of claim 17, wherein the first coordinate system includes a depth axis, and the first parameter causes the stronger filtering along the depth axis than along other axes of the first coordinate system.

20. The XR device of claim 17, wherein each of the plurality of camera space-specific filter parameters comprises weights to be applied to a component of each pose data item in the time series, the component being associated with the respective axis.

* * * * *